United States Patent [19]

Cappello et al.

[11] Patent Number: 4,751,665
[45] Date of Patent: Jun. 14, 1988

[54] SYSTOLIC SUPER SUMMATION DEVICE

[75] Inventors: Peter R. Cappello, Santa Barbara, Calif.; Willard L. Miranker, New York, N.Y.

[73] Assignee: International Business Machines Corporation, Armonk, N.Y.

[21] Appl. No.: 832,282

[22] Filed: Feb. 24, 1986

[51] Int. Cl.⁴ .............................................. G06F 7/50
[52] U.S. Cl. ..................................................... 364/748
[58] Field of Search ......................................... 364/748

[56] References Cited

U.S. PATENT DOCUMENTS 4,622,650 11/1986 Kulisch ............................. 364/748
4,644,490 2/1976 Kobayashi et al. ................. 364/748

OTHER PUBLICATIONS

Hildebrandt et al, "True Floating Point Better and Becoming Cost Competitive", *Computer Design*, Nov. 1984, pp. 191-196.

Primary Examiner—David H. Malzahn
Attorney, Agent, or Firm—Sughrue, Mion, Zinn, Macpeak, and Seas

[57] ABSTRACT

A cellular architecture for a systolic super summer for high throughput performance of repeated sums of floating-point numbers. The summer receives pipelined inputs of streams of summands, converts the floating-point summands into a fixed-point form by a sieve-like pipelined cellular network, and sums the emerging fixed-point numbers in a corresponding network of extremely long accumulators. The throughput per unit area of the hardware approaches that of a tree network, but without the long wires and signal propagation that are intrinsic to tree networks.

19 Claims, 30 Drawing Sheets

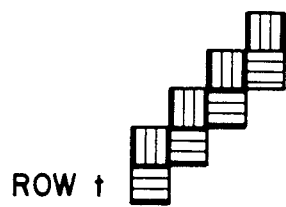
FIG. 21
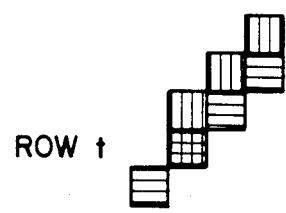
FIG. 22
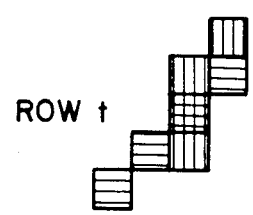
FIG. 23
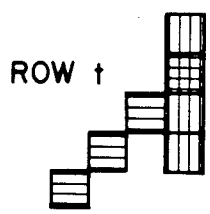
FIG. 24
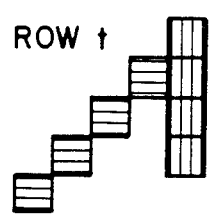
FIG. 25
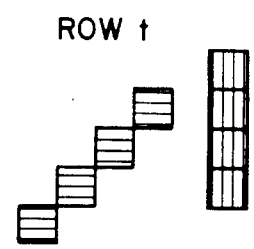
FIG. 26
FIG. 27
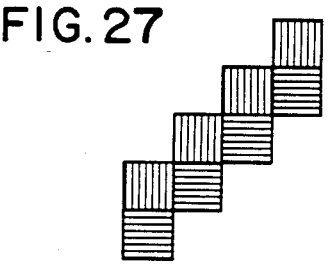
FIG. 28
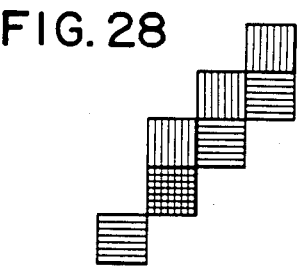
FIG. 29
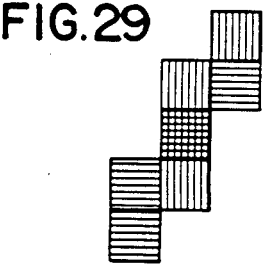
FIG. 30
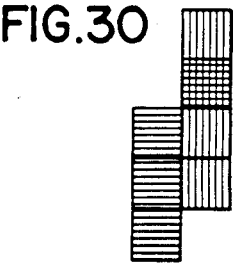
FIG. 31

ROW t

ROW t

ROW t

ROW t

ROW t

ROW t

ROW t

ROW t

ROW t

ROW t

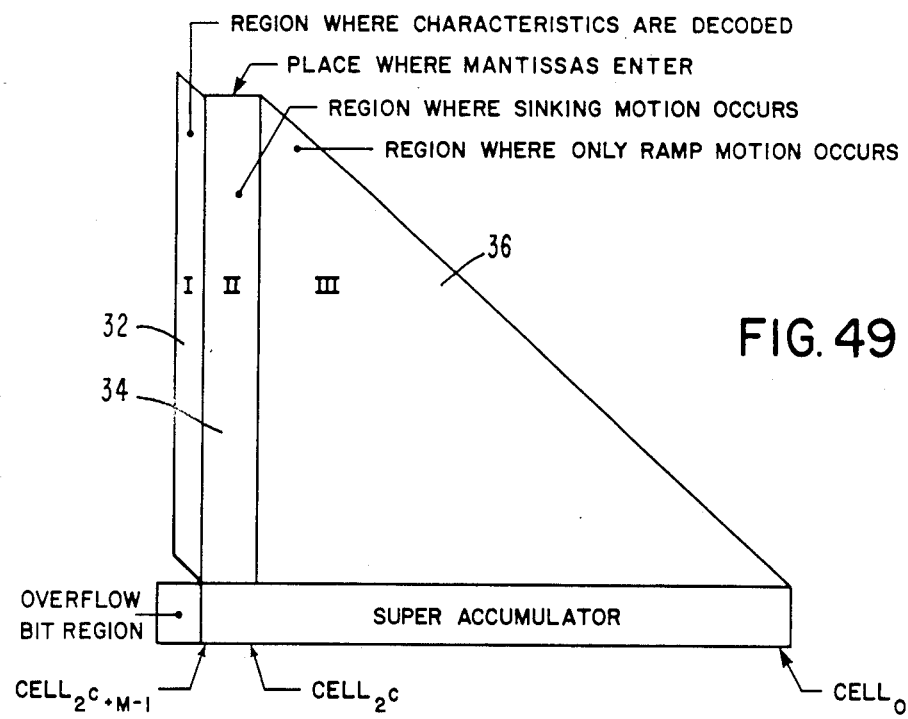
FIG. 49
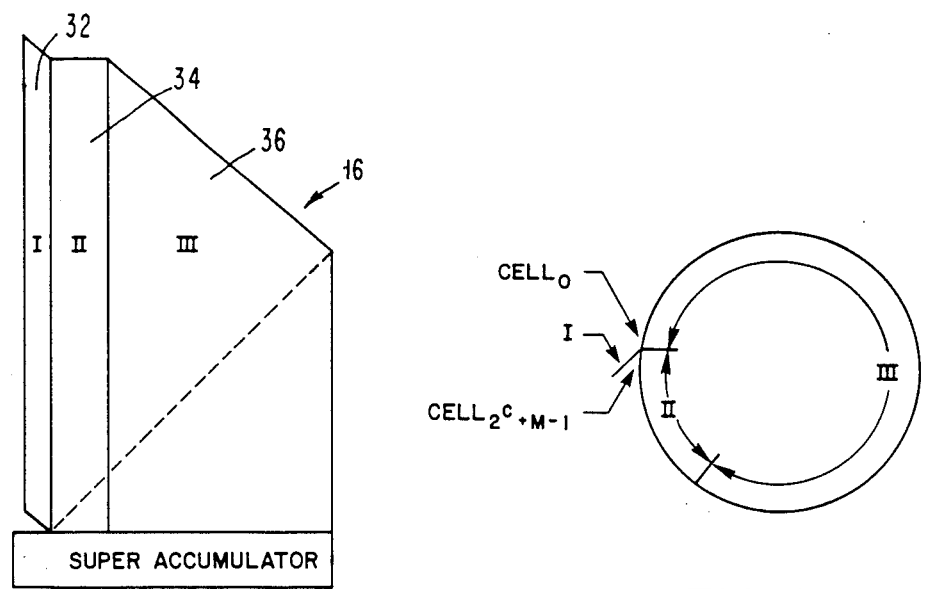
FIG. 50
FIG. 51

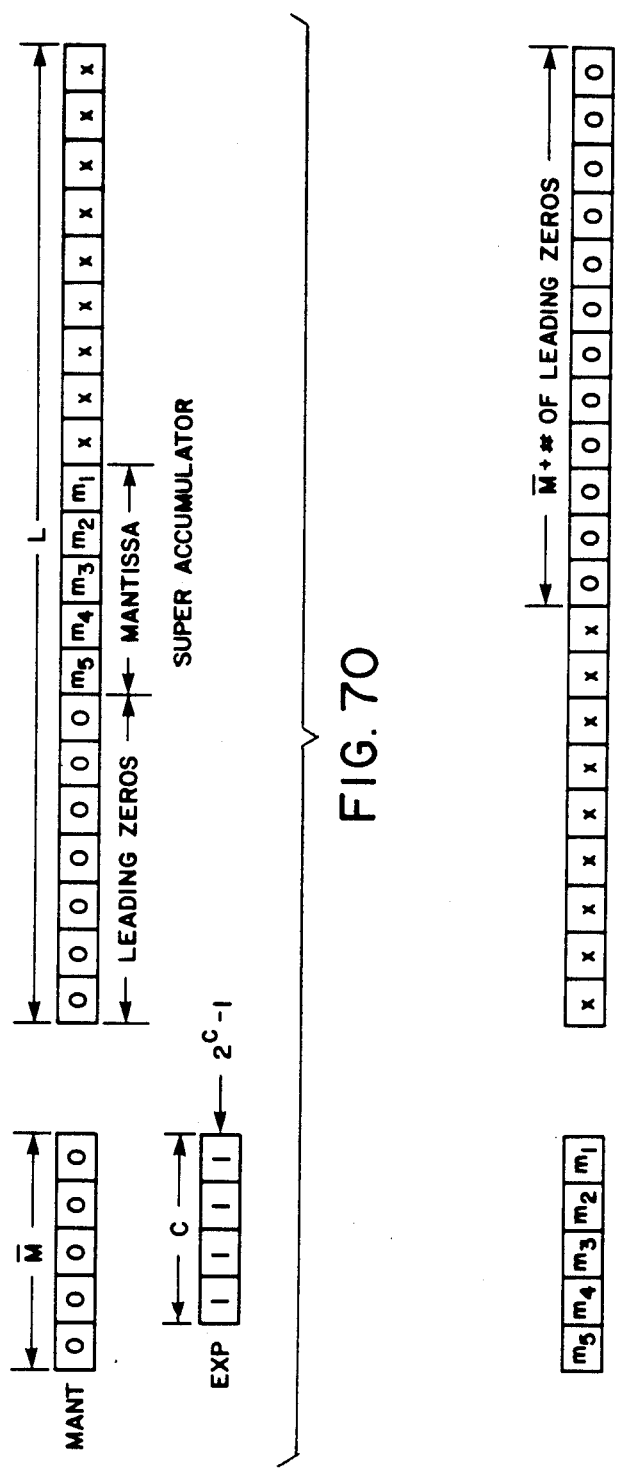
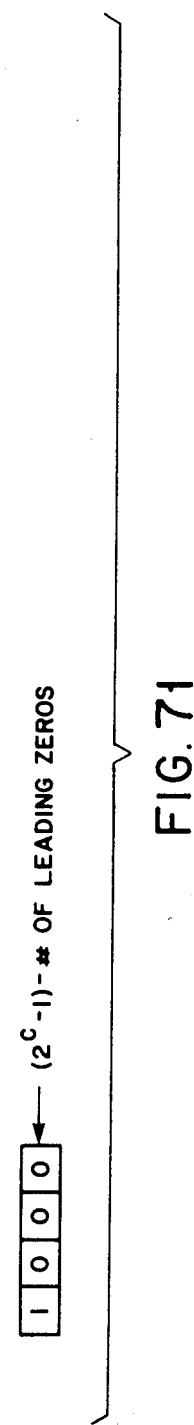
FIG. 70
FIG. 71

POST-PROCESSING
APPARATUS

SYSTOLIC SUPER SUMMATION DEVICE

DESCRIPTION

1. Technical Field

This invention is directed to a systolic summation device for the high throughput, high accuracy, performance of repeated sums of floating-point numbers.

2. Prior Art

Floating-point arithmetic is fundamental to scientific computation. The four basic floating-point operations, $+$, $-$, $\times$ and $/$ have been part of the arithmetic units of digital computers for many years. Today no processor intended for scientific or engineering applications can fail to offer high performance floating-point arithmetic in some form (intrinsic hardware, coprocessor hardware, microcoded implementation, etc.).

As an approximation to the exact arithmetic operations $+$, $-$, $\times$ and $/$ performed on pairs of real numbers, the floating-point operations $+$, $-$, $\times$ and $/$, when performed on pairs of floating-point numbers, deliver results which are accurate to the last figure of precision in the computer. Of course, this is predicated on a proper implementation of both a rounding operator $\Box$ and of floating-point arithmetic on the computer. However, when floating point operations are combined, even for a computation as elementary as $a + b + c$, the relative error of the result may be as large in magnitude as the greatest floating-point number representable in the computer. In addition to the reals, scientific computation employs the so-called higher data types of computation such as complex (numbers), vectors and matrices of real and complex, as well as intervals over all of these. The basic operations for such data types involve expressions such $a + b + c$. Indeed these basic operations involve inner products $\cdot$ of n-tuples of floating-point numbers. Thus, even with the best possible implementation of the floating-point operations $+$, $-$, $\times$ and $/$, a computer will frequently deliver poor results for the basic operations of scientific computation.

A new theory of floating-point arithmetic, described by U. W. Kulisch and W. L. Miranker, *Computer Arithmetic in Theory and Practice,* Academic Press, 1981, has shown one way out of this limitation to accuracy in scientific computation. Basically by augmenting the conventional four floating-point operations with a fifth floating-point operation $\cdot$, called the inner product, the full computer accuracy available in floating-point operations on pairs of reals can be provided for all floating-point operations on all of the higher data types of scientific computation. In this sense, the results of such operations are the data types closest to the ideal full precision results.

Given two vectors $x=(x_i, \ldots, x_N)$ and $y=(y_1, \ldots, y_N)$ of floating-point numbers, the operation $\cdot$ is defined by $$x \cdot y = \left( \sum_{i=1}^{N} x_i y_i \right).$$

That is, $x \cdot y$ is that floating-point number which would be obtained by first computing $$\sum_{i=1}^{N} x_i y_i$$

in exact arithmetic and then rounding the sum once. We may say that $x \cdot y$ is that floating-point number which represents the exact inner product $$\sum_{i=1}^{N} x_i y_i$$

with an accuracy equivalent to the loss of information represented by a single rounding operation.

Such an operation can be simulated by iterative algorithms as described in the Kulisch and Miranker publication cited above. Parallel versions of these algorithms also have been studied. See, H. Leuprecht et al, "Parallel Algorithms for the Rounding Exact Summation of Floating Point Numbers," *Computing* 28, 1982. A hardware unit has also been devised for a higher performance implementation. See, G. Bohlender et al, "Features of a Hardware Implementation of an Optimal Arithmetic," *A New Approach to Scientific Computation,* edited by U. W. Kulisch and W. L. Miranker, Academic Press, 1983. This particular hardware implementation involves a so-called long accumulator. This latter approach has been more or less implemented, by means of microcoded assists, in a commercially available processor, the IBM 4361, which offers the fifth floating-point operation $\cdot$.

A normalized floating-point number x (in sign-magnitude representation) is a real number x in the form $$x = \sigma m b^e$$

Here $\sigma \in \{+,-\}$ is the sign of the number (sign(x)), m is the mantissa (mant(x)), b is the base of the number system in use and e is the exponent (exp (x)). b is an integer greater than unity. The exponent is an integer between two fixed integer bounds e1, e2, and usually $e1 \leq 0 \leq e2$. The mantissa m is of the form $$m = \sum_{i=1}^{l} d[i] b^{-i}$$

The $d[i]$ are the digits of the mantissa numbered in decreasing order of significance. They have the properties $d[i]\in\{0,1,\ldots,b-1\}$ for all $i=1(1)l$ and $d[1]\neq 0$. Without the condition $d[1]\neq 0$, floating-point numbers are called denormalized. The set of normalized floating-point numbers does not contain zero. For a unique representation of zero it is assumed that $\text{sign}(0)=+$, $\text{mant}(0)=0.00\ldots 0$ (l zeros after the radix point) and $\exp(0)=e1$. A floating-point system depends on the constants b, l, e1, and e2, and will be hereinafter denoted by $R=R(b,l,e1,e2)$.

Let $x=(x_1, \ldots, x_N)$ and $y=(y_1, \ldots y_N)$ be vectors of normalized floating-point numbers. Let $$x_i = \sigma_{xi} m_{xi} b^{ex_i}, \quad y_i = \sigma_{yi} m_{yi} b^{ey_i}, \quad i = 1, \ldots, N.$$

Let $$z_i = \sigma_{zi} m_{zi} b^{ez_i},$$

where

-continued
$$\sigma_{zi} = \sigma_{xi}\sigma_{yi}, m_{zi} = m_{xi}m_{yi}, e_{zi} = e_{xi}e_{yi}, i = 1, \ldots N.$$

Then $z_i \epsilon R(b,2l,2e1,2e2)$. Moreover $x \cdot y$ could be computed if $$FLIP = \Box \sum_{i=1}^{N} z_i$$

could be determined. Here, it is noted that $\Box$ is needed to map $R(b,2l,2e1,2e2) \rightarrow R(b,l,e,1,e2)$.

SUMMARY OF THE INVENTION

It is, therefore, an object of the present invention to provide a systolic summer for calculating sums of floating point numbers with high throughput and high accuracy.

It is a further object of this invention to achieve such a summer in a compact design with a minimum hardware complexity.

Briefly, these and other objects of the invention are achieved by the combination of a "sieve" and an accumulator pipeline. The accumulator pipeline includes a first level accumulator $\alpha_0$ which is a super (-long) accumulator, e.g., long enough to accommodate, in fixed point format, at least the entire range of values of the summand inputs. The sieve is a logic network which essentially sorts the summands in accordance with the values of their characteristics and deposits the mantissa of each summand in the appropriate location of the accumulator. The accumulated sum is then shifted to normalize the sum, while simultaneously encoding to floating point representation. Rounding is then performed in accordance with a desired rounding technique.

The entire apparatus is pipelined and cellular, with summands arriving in serial-parallel order and each bit of each characteristic being examined in sequence. This is performed in a characteristic decoding region which includes a plurality of levels corresponding to different characteristic values, with each level in the characteristic decoding region including a plurality of bit comparators. Each bit comparator in each characteristic decoding level will be simultaneously examining different bits from different ones of the skewed characteristics as they progress through the characteristic decoding region. When any particular level has detected a succession of matches for a complete characteristic, a "fit" signal is provided.

The sieve further includes a matrix of cells including a "sinking" region and a "ramp" region. The mantissa bits, skewed in serial-parallel order, will pass downward through the sinking region until the characteristic is decoded. As soon as the characteristic of a summand has been decoded, the proper position of the corresponding mantissa in the accumulator is known, and the mantissa begins diagonal movement through the ramp region so that it will arrive at the accumulator in the proper position.

With some mantissas descending vertically through the sieve and others moving diagonally at any given time, collisions between mantissa bits will often occur. In order to separately handle bits of different mantissas, the cell structure would have to be quite complex, especially at lower levels of the sieve. To overcome this problem, the sieve employed in this invention is provided with a signal combining, or "coalescence", feature whereby colliding mantissas will in some cases be combined to reduce the total number of bits which must be handled. For example, bits which collide with one another while continuing their respective vertical and diagonal movement through the sieve will be transmitted on without coalescence, since they are destined for different positions in the accumulator. However, when one bit following a diagonal path and another following a vertical path collide in a cell at the same time as the second bit is making a transition from vertical to diagonal movement, the two bits will be destined for the same position in the accumulator and can be immediately summed without loss of accuracy. The sum bit will then continue on the same diagonal path, while a carry bit will follow a parallel path to a more significant bit position in the accumulator. By also providing means for coalescing sum and carry bits which collide with other mantissa bits, the complexity of the cells can be bounded.

To significantly enhance the capacity of the device, the sieve and accumulator are configured in a cylindrical manner, with a plurality of sinking regions provided above respective portions of the cylindrical accumulator. The sinking regions have respective characteristic decoding regions which decode characteristics in a different sequence corresponding to the circumferential position of the sinking region around the cylinder. The sieve cells are designed to permit vertically moving "sinking" mantissa bits and diagonally moving "rolling" mantissa bits to pass through the same cells.

In the accumulator, a number of clock cycles may be required to complete carry resolution, normalization, encoding and rounding before a floating point representation of the sum is ready for exit from the apparatus. Thus, the accumulator is "pipe-lined" by providing a stack of accumulators. When a fixed-point sum is complete in the first accumulator, as indicated by an end-of-sum signal reaching the accumulator after the last bit of the last summand in that sum, the contents of the first accumulator are then shifted into the next accumulator in the pipeline while continuing the carry resolution, normalization and encoding processes. Each cycle, the passage through the accumulator pipeline continues, while the first accumulator in the pipeline is re-initialized and begins accumulating mantissas in the next sum. When a completed floating point representation of a sum is ready for departure from the apparatus, it is passed vertically through the accumulator pipeline to a sum departure region. Since sums may be completed in an order other than their order of entry into the apparatus, a tag is assigned to each sum and accompanies that sum through the apparatus.

BRIEF DESCRIPTION OF THE DRAWINGS

The invention will be more clearly understood from the following description in conjunction with the accompanying drawings, wherein:

FIGS. 21–26 illustrate a collision of bits wherein summand $w_{i+1}$ is decoded and begins its ramp motion, with summand $w_1$ remaining undecoded during the time interval when the mantissas of the two summands are colliding, so that each mantissa passes through the other;

FIGS. 27–31 illustrate summand $w_i$ being decoded one cycle after summand $w_{i+1}$, with the summands passing through one another;

FIG. 49 is an enlarged schematic of a portion of the summer of FIG. 1;

FIGS. 50 and 51 are front and top views, respectively, of a cylindrical version of the sieve of FIG. 49, with the cells indicated in FIG. 51 being those of the super accumulator in FIG. 49;

FIGS. 70 and 71 illustrate the elements needed to perform normalization and characteristic encoding for $M=5$ and $C=4$, with FIG. 70 showing the components before normalization for the case of seven leading zeros, and FIG. 71 showing the components after normalization;

DETAILED DESCRIPTION OF THE PREFERRED EMBODIMENT OF THE INVENTION

Figure 1:
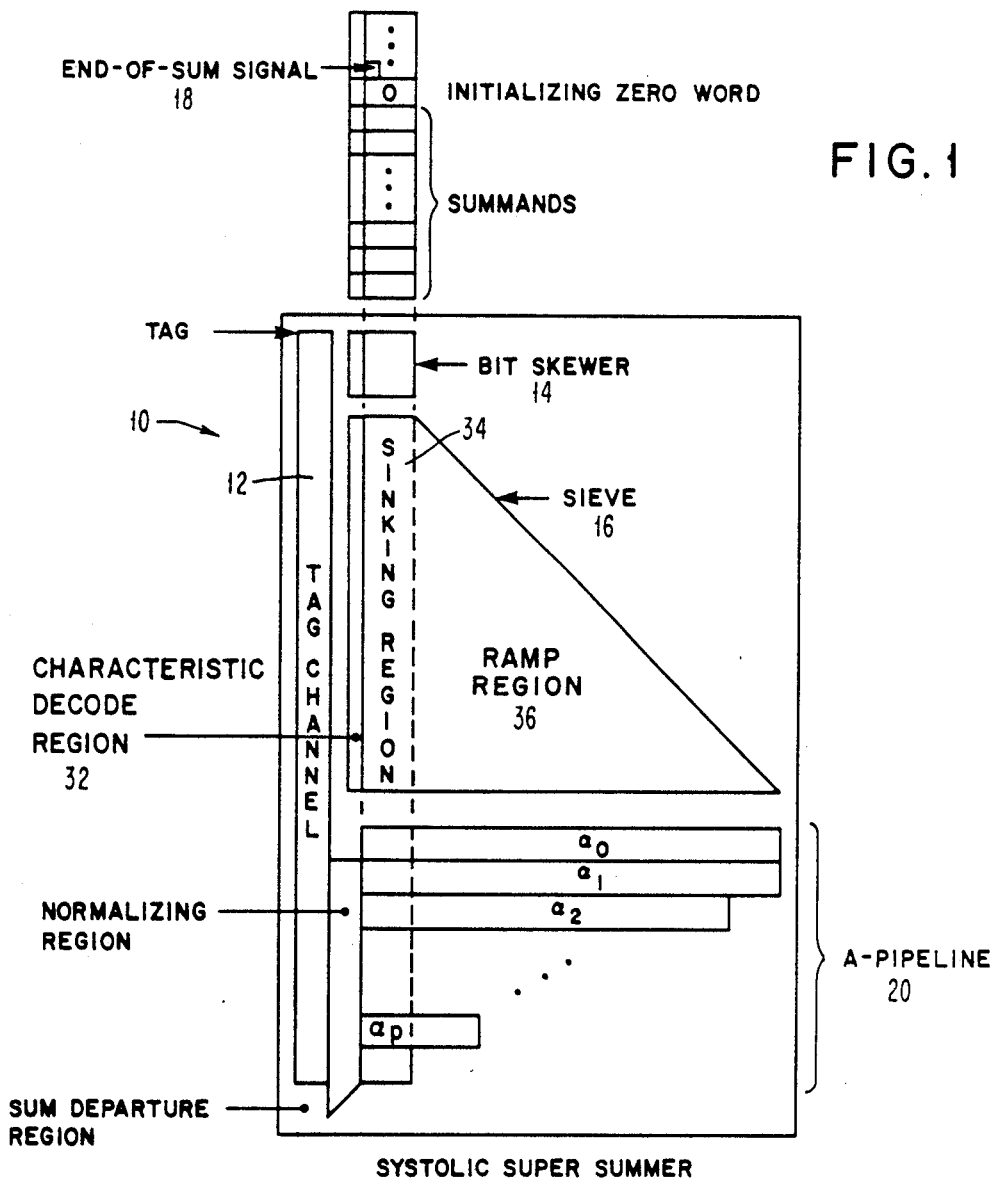
FIG. 1 is a schematic overview of the systolic super summer of the present invention.

The following description presents a design for a hardware implementation of FLIP. For convenience here, only the case of binary arithmetic will be considered, i.e., b=2. Further, assume M=2l, and that C= 2+log$_2$ |e1|+log$_2$ e2, where $i$ denotes the integer part of i. That is, assume that the binary floating-point numbers $z_i$ have M mantissa bits, and have C bits in their characteristic (exponent).

In presenting the design, it is convenient to suppose at first that the numbers $z_i$ are unsigned. This amounts to a separation of the summands in an actual inner product into two sub sums; one for the positive summands and one for the negative. The two corresponding sums are determined separately and their results are combined. An overview of the design will first be given, followed by a more formal design. Finally, refinements and extensions will be discussed, e.g., signed summation, directed rounding, and an accumulation mode.

The model of computation used in this description is the synchronous model of VLSI, e.g., as described by C. D. Thomson, "Area-Time Complexity for VLSI," *Proc. 11th Annual Sym. on the Theory of Computing* April, 1979; R. P. Brent et al, "The Area-Time Complexity of Binary Multiplication," *JACM* Vol. 28, No. 3, July 1981; and G. Bilardi et al, "A Critique and an Appraisal of VLSI Models of Computation," *VLSI Systems and Computations*, Edited by H. T. Kung, et al, Computer Science Press, Rockville, Md., 1981. (As will be seen below, a method for increasing the performance of the final stage of the present invention does in fact asynchronize the architecture, but this asynchronism is not at the cell level.) Also, the present application will deal with a family of functions and circuits that are parameterized by a vector $\pi=$(M,C). Asymptotic complexity will be measured with respect to parameter vector $\pi$ throughout this description.

Before proceeding, the following items should be defined:

The functional latency (or time) of a circuit is the amount of time separating the appearance of the first input bit on some port, from the appearance of the last output bit on some port, for one computation of the function f, denoted $T_f$. This corresponds to the usual use of the term "speed of operation." A "100-nanosecond" multiplier, for example, means that 100 nanoseconds elapse between the appearance of the first input bit of the multiplicands and the last output bit of the product.

Direct communication between two cells is cellular when the separation of the two cells in space is O(1). If all cells in a design use only cellular communication, then the design is cellular (like that of a cellular automaton as described in *Essays on Cellular Automata*, edited by A. W. Burks, Univ. of Illinois Press, Urbana, IL., 1970).

The device of this invention is intended primarily to achieve a high throughput rate, with consideration of latency secondary. This goal has two related reasons. First, high throughput, not short latency, is considered a requirement of the applications using the device. Second, high throughput designs generally can be achieved using cellular communication, which is well suited to VLSI and printed circuit board technology.

The interest in high throughput, thus, stems in part from technological constraints. Moreover, the use of the apparatus of this invention in a highly parallel processor environment is foreseen. Many processors can be at work, with their arithmetic units generating a great flow of vector pairs whose inner products are needed. These are sent to the apparatus of the present invention for determination. As described here, the apparatus of this invention performs only the critical summation part of the inner product. Of course, performing the elementary products is a function which could be appended. Because it is cellular and because it uses extremely long (i.e., super) accumulators, the invention is called a "systolic super summer".

An overview of the design will now be given with reference to FIG. 1. It is assumed that a block of floating-point numbers in R(2,M,2e1,2e2) representing summands arrive at the systolic super summer 10 in bit-parallel order. The zero floating-point number has been appended to the end of a block in order to flush and initialize the apparatus. Each block receives a tag as it arrives. The tag flows down a tag channel 12 alongside the apparatus in step with the summation process. In this manner each completed sum, a number in R(2,l,e1-,e2), is tagged as it emerges from the apparatus. In fact, we allow the analyst mantissa length to be a device parameter called $\overline{M}<M$. Thus, the completed sum is a number in R(2,$\overline{M}$,e1,e2).

Upon entry, the summands flow through a bit skewing device 14, emerging from it in serial-parallel order to achieve a cellular operation in the sieve 16. The skewed summands enter the sieve 16. Following the last summand into the sieve is a bit 18, the end-of-sum signal, later to be called $\sigma$. The sieve 16 is a systolic packet switching network with signal combining. The mantissa of an entering summand is switched from its entry at the top of the sieve to an appropriate position at the bottom. The switching path is determined by the exponent (i.e., characteristic) of the summand. The appropriately switched summand mantissa emerging from the sieve enters an A-pipeline 20 of accumulators, themselves denoted $\alpha_0, \alpha_1, \ldots, \alpha_{p+1}$ successively. These accumulators are able to accommodate each mantissa as if it were a fixed-point number, and the sieve is a shifting device for determining the correct fixed-point position for addition of the summands in $\alpha_0$. $\alpha_0$ is $M+2^C$ bits long, a super(-long) accumulator. In fact several, e.g., F, overflow bit positions are appended to the left (the high-order end) of $\alpha_0$ as well as to all other accumulators in the A-pipeline.

The sum is accumulated in accumulator $\alpha_0$. The end-of-sum signal 18 bumps the contents of accumulator $\alpha_0$ to the next accumulator $\alpha_1$. Thus, $\alpha_0$ is initialized and ready for the next sum which may emerge from the sieve. In accumulator $\alpha_1$, the carry resolution process in the summing continues, if necessary. This is combined with the encoding of the sum into a floating-point number in $R(2,\overline{M},e1,e2)$. That is, as new sums arrive to bump predecessor sums down the A-pipeline, the latter are completing their carry resolution, shifting out leading zeros (normalizing), re-encoding the exponent, and finally rounding; all of this more or less concurrently.

Since sums may be completed in an order quite different from their order of entry into the super summer, the A-pipeline 20 is provided with a sum completion detection capability. As soon as a completed sum is detected, it is made to descend through the A-pipeline to be ejected from the apparatus. A completed sum may pass through other sums which are still in process. This early sum departure feature asynchronizes the process, and it is for this reason that sum tagging is introduced. An identity pointer (tag) enters the device with each summand block. The tag flows through the tag channel 12 in step with the summation process, and accompanies the sum as it departs the apparatus.

Figure 2:
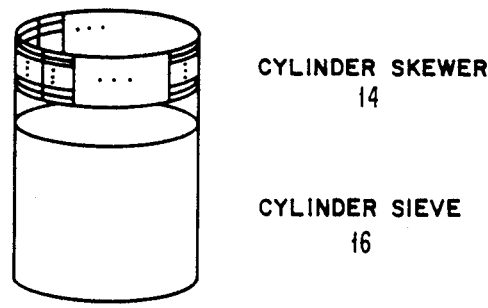
FIG. 2 is an illustration of the cylindrical arrangement of the summer of the present invention.

Entry of a sum into the sieve 16 occupies only M of the $M+2^C$ bit width of the sieve. Thus, the design of the preferred embodiment is modified to increase entry capacity. The sieve is augmented into a so-called cylinder sieve as generally shown in FIG. 2. Every disjoint band of width M becomes a port of entry into the sieve 16, thereby increasing its throughput. The resulting protocol of packet switching and signal combining is more complicated, and its regulation is a key part of the design of this invention.

A more detailed description will now be given beginning first with the bit skewer 14.

Bit Skewer

A summand is denoted $c_1 c_2 \ldots c_C m_1 m_2 \ldots m_y$, where $c_{1 \leq j \leq C}$ are the characteristic bit values and $m_{1 \leq j \leq M}$ are the mantissa bit values. As is customary, these bits are numbered in decreasing order of significance. At times, it may be convenient to consider an input simply as a string of bits, $w_1 w_2 \ldots w_W = c_1 c_2 \ldots c_C m_1 m_2 \ldots m_M$, where $$W = C + M.$$

The index i is used herein to distinguish between different summands, so that $w_{ij}$ denotes the $j^{th}$ bit of the $i^{th}$ summand. The notations $c_{ij}$ and $m_{ij}$ are similarly used.

Figure 3:
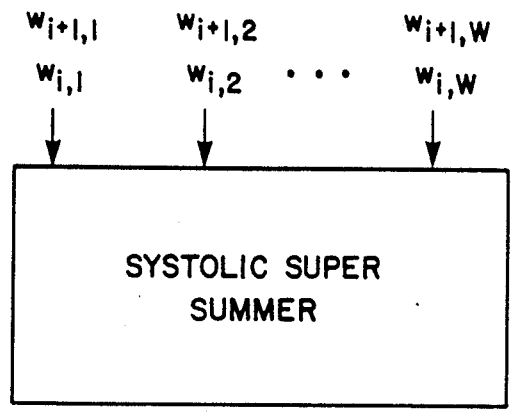
FIG. 3 is a diagram illustrating the bit-parallel arrival of summand bits.
Figure 4:
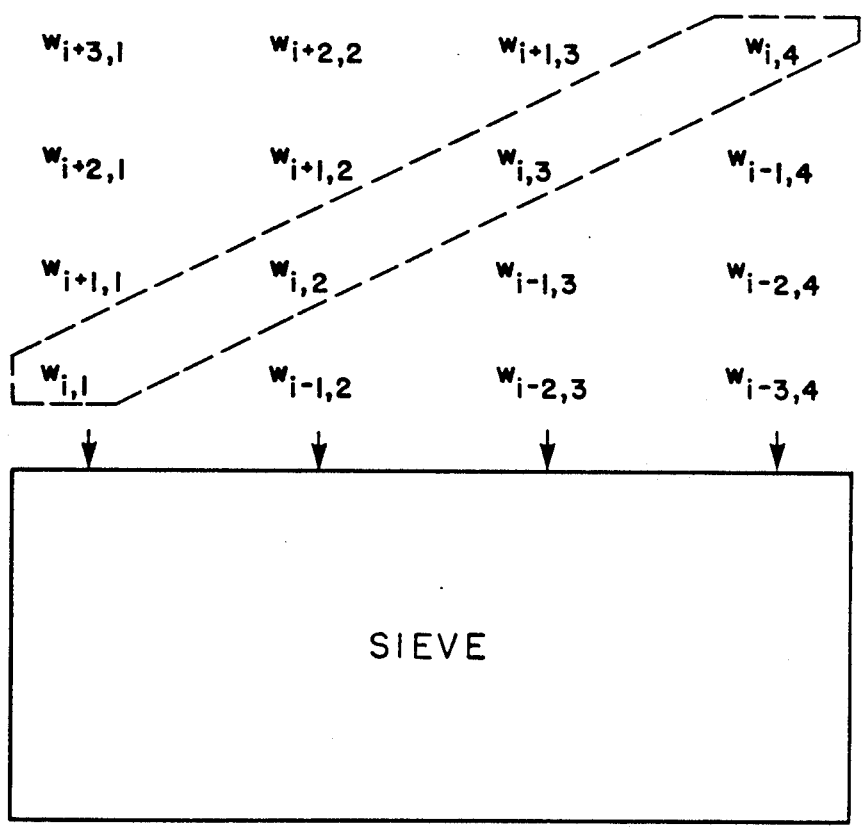
FIG. 4 is an illustration of the serial-parallel arrival of summands after bit-parallel summands are skewed in time, with the dashed lines in FIG. 4 enclosing the bits comprising the $i^{th}$ input word $w_i$.

It is assumed that a summand arrives in bit-parallel order, as indicated in FIG. 3. The present invention requires that the arrival of summand bits be serial-parallel (i.e., bit-parallel but skewed in time). This design is compatible with the goal of purely cellular communication. The first task, then, is to skew the summand bits in time, so that its entry into the sieve 16 is serial-parallel, as generally shown in FIG. 4. (It should be noted that the bit skewer could be omitted if the process in which the super summer of this invention is to be used is one which already produces the summands in serial-parallel form, e.g., where the summands are individual products in an inner product computation in which the product is produced by a pipelined multiplier.)

Figure 5:
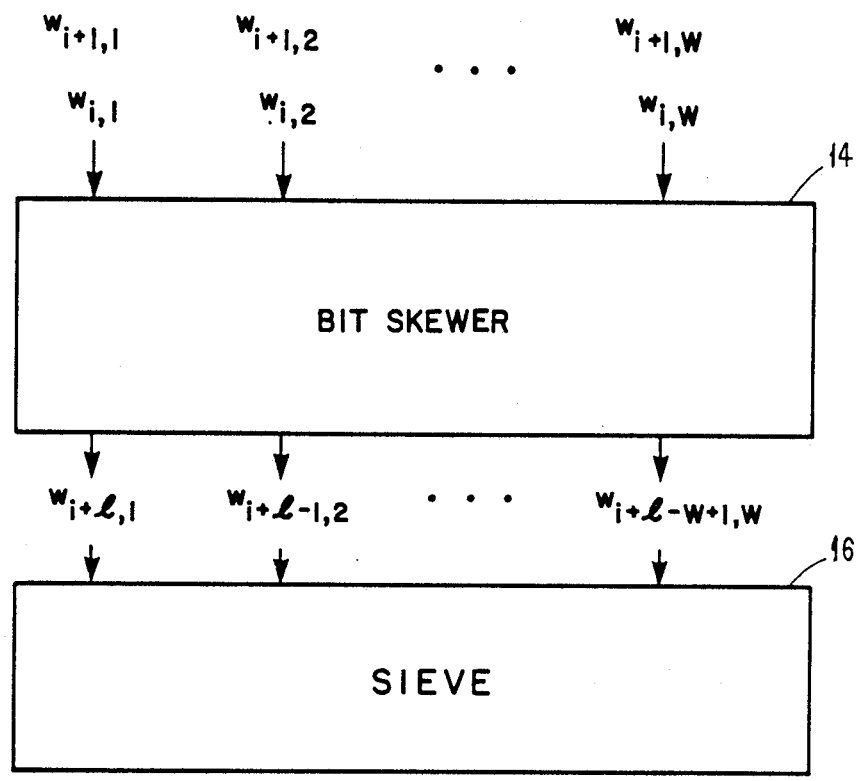
FIG. 5 illustrates the bit skewer of FIG. 1 receiving bit-parallel summands and providing serial-parallel summand outputs.

The skewing apparatus 14 is depicted informally in FIG. 5. Two designs for the skewer are disclosed here. The first one uses broadcasting. This design is then transformed into one where only cellular communication is used. A cell diagram for the first skewer is give in FIG. 6. The bit $w_j$ is delayed j cycles. Black cells are delays; white cells output their input without delay as illustrated in FIG. 7. The coloring for a general array of cells is as follows:

Cell$_{ij}$ is black for $1 \leq i \leq j \leq W$.

Figure 6:
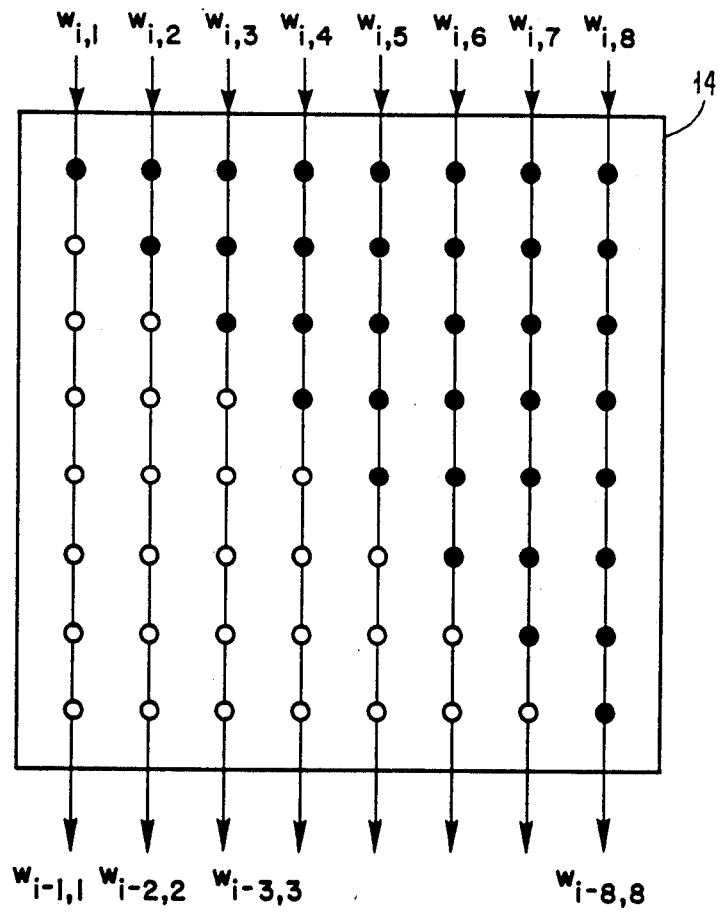
FIG. 6 is a diagram for explaining the operation of the skewer 14 in FIG. 1, for $W=C+M=8$.
Figure 7:
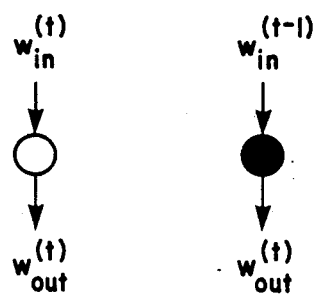
FIG. 7 is a diagram for explaining the input-output characteristics of individual cells in the illustration of FIG. 6.

Cell$_{ij}$ is white for $1 \leq j < i \leq W$, where i designates row and j designates column in FIG. 6. That is, the upper triangle of the square array of cells is black, and cells below the main diagonal are white. Black cells behave as follows.

$$w_{out}(t) \leftarrow w_{in}(t-1).$$

White cells behave as follows:

$$w_{out}(t) \leftarrow w_{in}(t).$$

Figure 8:
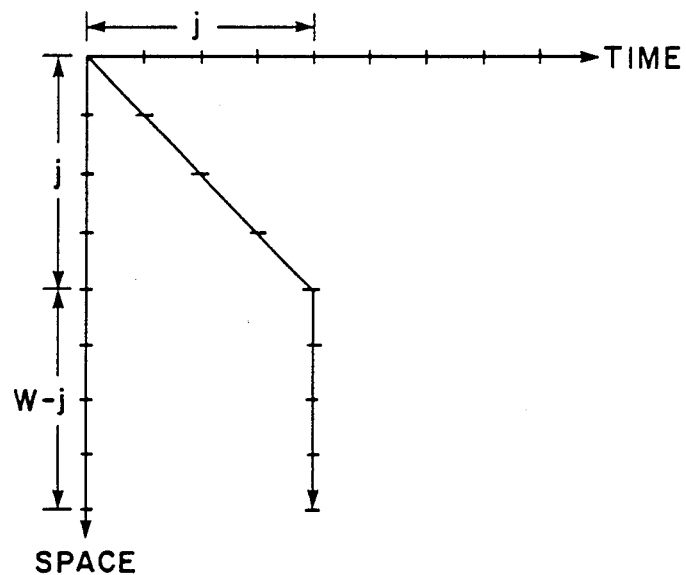
FIG. 8 is a space-time diagram for movement of a bit $w_j$ through cell column j, with a period of $O(1)$ and a latency of $O(j)$.

In this design, denoted $\Gamma$, cell$_{i,i-1}$ broadcasts its value to cell$_i$, $w$ through white cells, so that a white cell may be thought of simply as a wire. The space-time diagram of $\Gamma$ is given in FIG. 8 for movement of bit $w_j$ through the $j^{th}$ column of cells.

Figure 9:
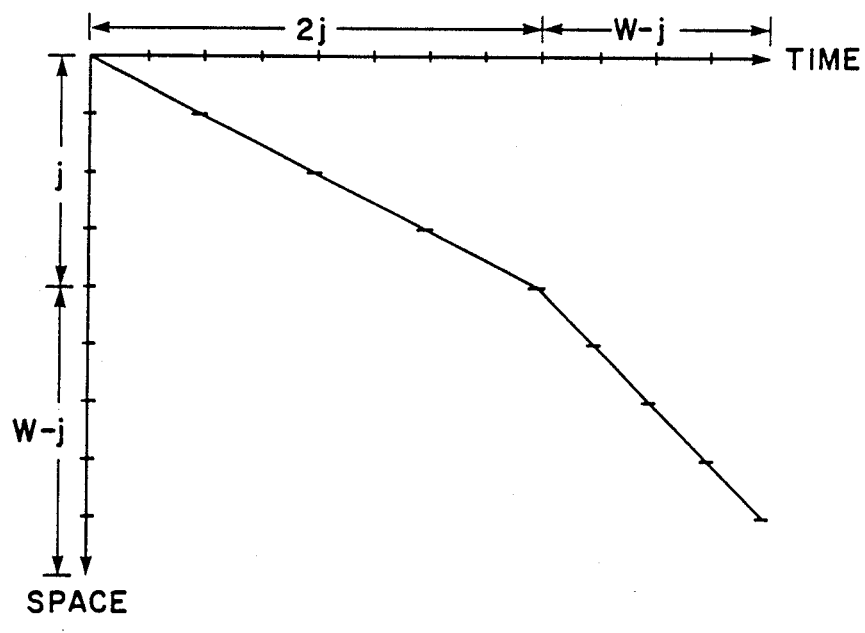
FIG. 9 is a further space-time diagram for movment of bit $w_j$ through cell column j with the delays of the individual cells of FIG. 6 lengthened for cellular operation.

The broadcast design $\Gamma$ is converted to a cellular design by a linear transformation T. The result of this transformation is depicted in FIG. 9 for movement of bit $w_j$ through the $j^{th}$ column of cells. The cell diagram of FIG. 6 can represent this skewer too. Now, however, black dots represent a delay of two cycles, with white dots representing a delay of a single cycle. Broadcasting is thus transformed to cellular communication. This is evident from the space-time diagram of FIG. 9, wherein it is seen that the line of communication through space-time is never perpendicular to time.

Sieve

After bit skewing, the next task is to place the mantissa into the correct portion of the super accumulator $\alpha_0$ in FIG. 1, with the position being determined by the summand characteristic. Summands with the smallest characteristic, for example, are input to the least significant part of the super accumulator $\alpha_0$, i.e., the rightmost M bits of the super accumulator.

Figure 10:
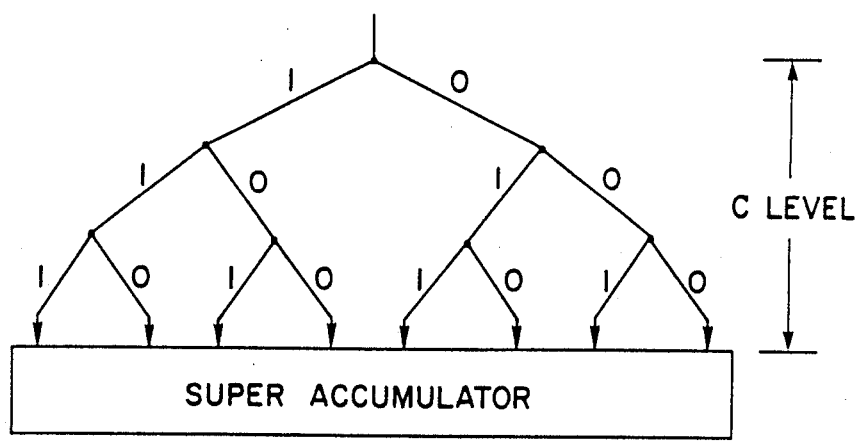
FIG. 10 is an illustration of a tree network for routing mantissas based on their characteristic values.

One way of handling mantissa placement would be through packet switching with a tree network, as indicated in FIG. 10. If the most significant characteristic bit were 1, the mantissa would be routed down the left branch of the tree; otherwise it would take the right branch. The second level would be used to route according to the second most significant bit, etc., until the least significant characteristic bit was examined, determining the exact slot for the mantissa within the super accumulator. In the preferred embodiment of this invention, this scheme is not used because it is not cellular. Tree distribution requires wires that are not O(1), and which would in fact span several chips.

Figure 11:
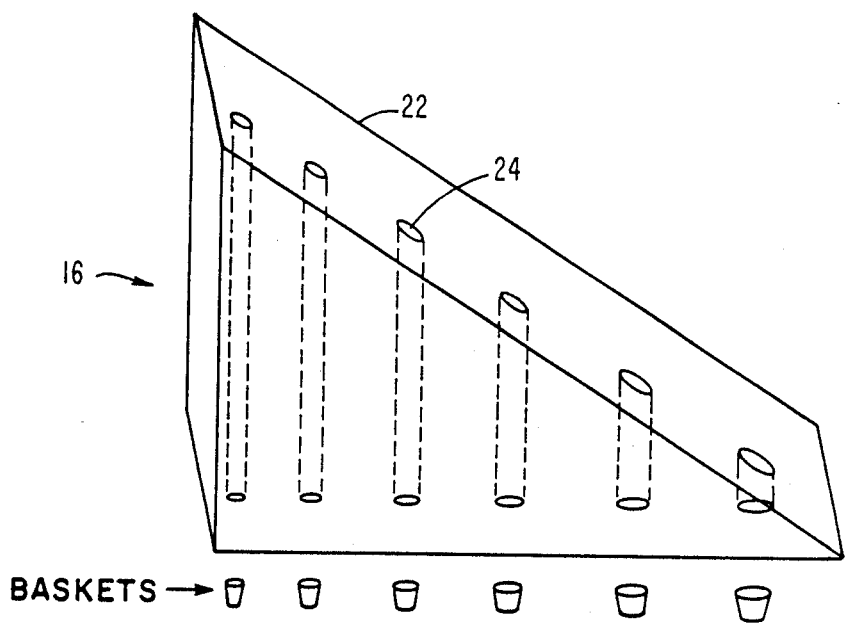
FIG. 11 is an illustration for explaining the sorting of mantissas analogized to the sizing of beads.

An alternative used in the present invention is the analog computation of a sieve. Summands are thought of as beads of different sizes and colors. A bead color is analogous to a summand mantissa. There are $2^M$ different colors, but these will be discussed at a later stage. The bead weight is analogous to a summand characteristic. The sieve sorts the beads, placing those of the same weight into the same basket (the same portion of the super accumulator). One way of doing this is conceptually depicted in FIG. 11 as a ramp 22 that contains holes 24 of increasing size. Each bead rolls down the ramp until it reaches the first hole that is big enough to accommodate it. At that point it falls straight down into the basket for beads of that size. This sieve design is based on the assumption that all beads are spherical masses of homogenous material, so that a bead weight increases with its diameter.

Figure 12:
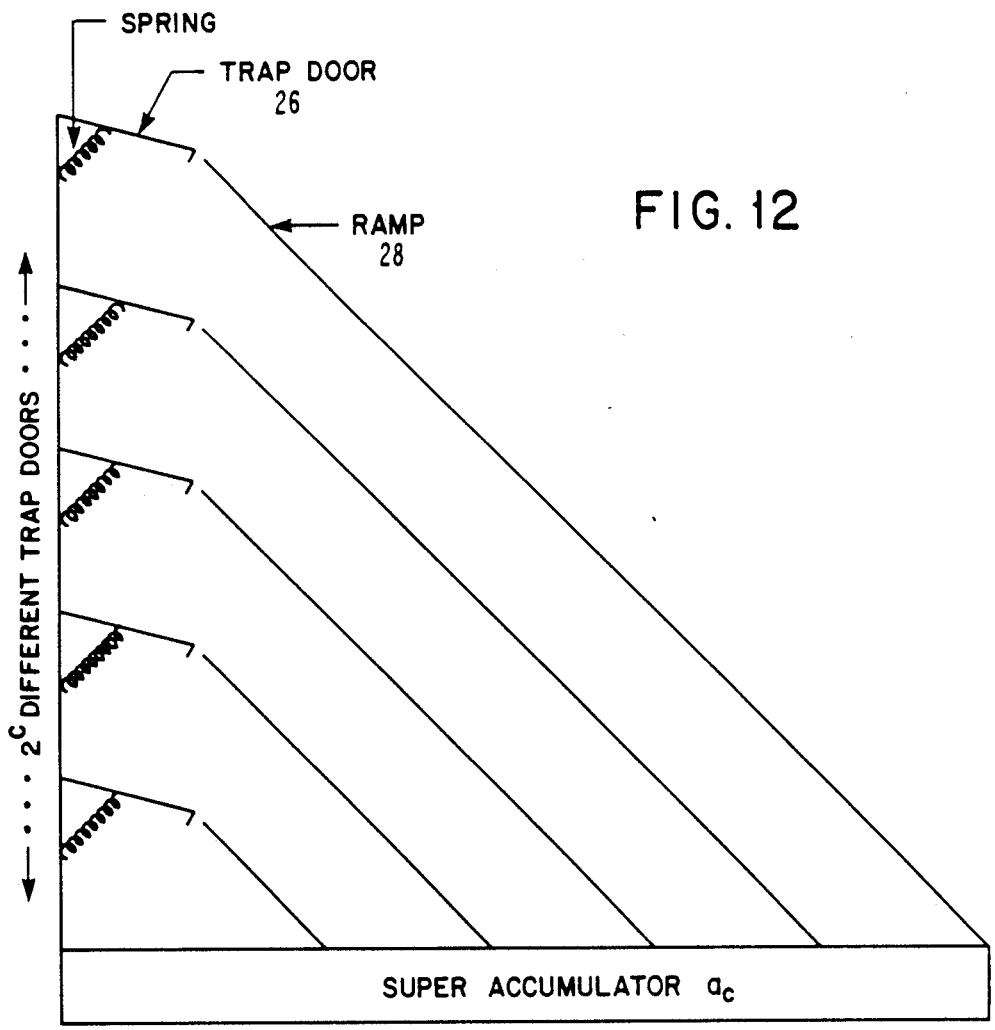
FIG. 12 illustrates an alternative arrangement for the sorting of mantissas based on their "weight"

The present inventors have found it more convenient to design a sieve which effectively weighs the beads directly, rather than indirectly through sizing. In this sieve, shown schematically in FIG. 12, the order of motions is reversed. A bead first descends straight down through a sequence of trap doors 26. The trap doors require successively more force to open them. The heaviest beads descend through all the doors. The lightest beads, on the other hand, are too light to descend through even the top trap door. The sequence of trap doors, then, determines the weight of a bead. When a bead is too light to drop through a trap door, it rolls to the right onto a ramp 28 that leads the bead to its proper basket (i.e., its proper position in the super accumulator $a_0$).

Figure 14:
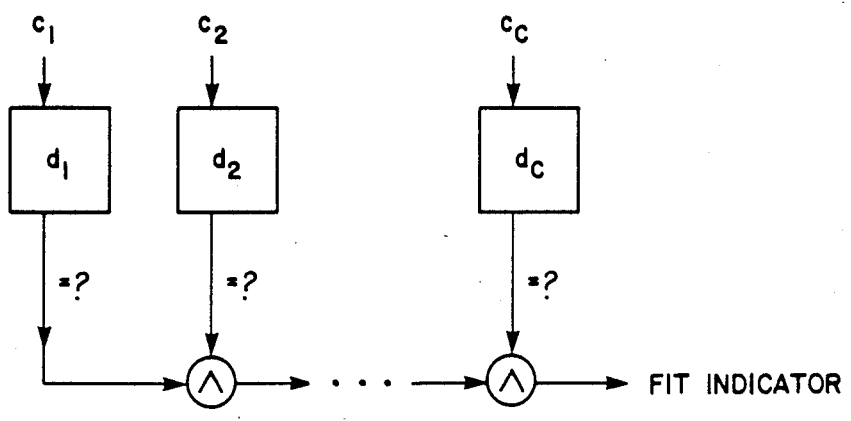
FIG. 14 is a diagram of logic for broadcast implementation of an individual comparison stage of FIG. 13.
Figure 13:
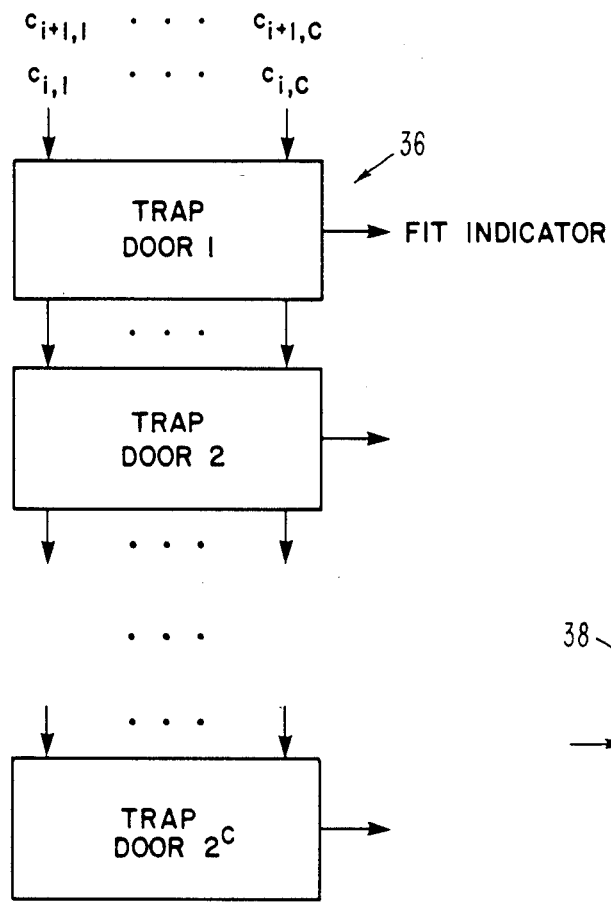
FIG. 13 illustrates the successive comparisons of summand characteristics against "sizing" values corresponding to respective trap doors.
Figure 16:
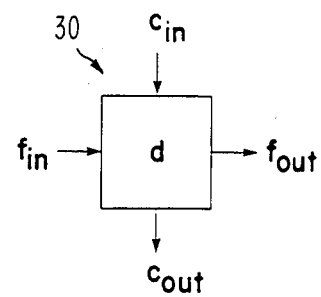
FIG. 16 is a diagram of an individual cell 30 in FIG. 15.
Figure 15:
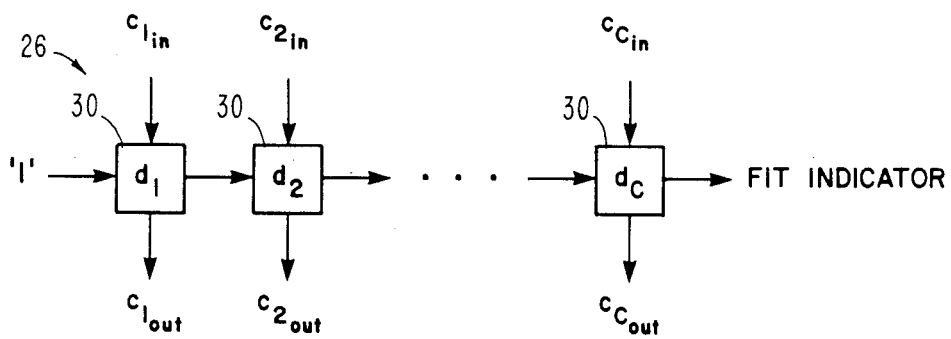
FIG. 15 is a logic diagram of a cellular arrangement for implementing individual comparison levels of FIG. 13.

Essential to both of these sieves is a device to determine the bead weight. This is the purpose of characteristic decoding, i.e., determining the magnitude of the summand and thereby also determining the "ramp" which leads to the proper "basket." Corresponding to each trap door is a characteristic value. Since there are C characteristic bits, there are $2^C$ distinct "bead weights", "trap doors", "ramps", and "baskets." Again, in the scheme of the present invention, a bead falls through trap doors of increasing spring tension, stopping when it encounters the first trap door with too much tension on its spring. A summand analogously passes its characteristic over a sequence of increasing values until a match is found. This computation is depicted in FIG. 13. Each characteristic bit c is compared to a corresponding trap door spring tension bit d, hereinafter called a sizing bit. The characteristic matches a trap door, or a corresponding order of magnitude, if and only if all bit comparisons are matches. Such a scheme is depicted in FIG. 14. Let $i=0, \ldots, 2^C-1$ index the levels of the sieve, starting at the top so that the sizing bits in the $i^{th}$ level are $d_{ij}$, $j=0, \ldots, C-1$. $d_{ij}$ is the $j^{th}$ bit in the binary expansion of i. It is advisable to avoid the C-ary AND depicted in FIG. 14, since it implies broadcasting the results of the individual characteristic bit comparisons. Indeed, one reason for skewing commands is to make possible a decoding of characteristics that is cellular. The arrival of the bits of a characteristic at the top of the trap door pipeline in FIG. 13 is skewed in time, and to take advantage of this, the cell diagram of a trap door may be as depicted in FIG. 15. Characteristic bits flow vertically through the trap door cells 30, with each cell 30 comparing its received characteristic bit with its sizing bit and providing an exact fit indicator if there is a match and if an exact fit indicator is also received from the cell 30 immediately to the left. Thus, the exact fit indicator (f) is accumulated horizontally. An individual trap door cell may be as depicted in FIG. 16, and its behavior is as follows:

$$c_{out}^{(t)} \leftarrow c_{in}^{(t-1)},$$

$$f_{out}^{(t)} \leftarrow f_{in}^{(t-1)} \quad (c_{in}^{(t)} = d).$$

$$f_{in} \leftarrow 1, \text{ for cell}_1.$$

Note that the time index of all output variables is one more than that of the input variables. This is true generally in the serial-parallel regime. Consequently, the time index will be hereinafter omitted in our input-output equations.

The fit indicator, $f_{out}$, of cell$_c$ is "1" if and only if all characteristic bits match their corresponding sizing bits. This happens for exactly one order of magnitude per characteristic. At this point, the characteristic has been weighed, or decoded, and its "weight", "ramp," and "basket" have been identified. Clearly, this decoding procedure is an implementation of a packet switching protocol, with packet $w_1 \ldots w_W$ partitioned into its switching address $c_1 \ldots c_C$ and its information $m_1 \ldots m_M$.

The above discussion of bead weight determination, or characteristic decoding, effectively explains the process which takes place in the characteristic decode region 32 of the sieve 16 in FIG. 1. The sinking region 34 in FIG. 1 corresponds to that part of the sieve through which the mantissas will pass until the characteristic has been decoded and the appropriate ramp is found. In the embodiment so far described, the sinking region 34 will be directly above the left-most M bits of the accumulator $a_0$.

Having been "sized", a characteristic must now begin its roll down the proper ramp to its correct position in the accumulator $a_0$. This transition will now be discussed in detail.

The two essential properties of a bead are its size and color, i.e., the characteristic and mantissa of the summand. Only the mantissa need "roll" down the ramp into the super accumulator $a_0$, since the ramp itself respects the previously determined characteristic information.

Cells that transmit color, i.e., mantissa, information behave as follows:
  IF an entering mantissa is rolling down a ramp (i.e., moving diagonally down)
  THEN it continues down the ramp
  OTHERWISE (it is sinking straight down)
  IF the fit indicator is on
    (meaning that this is the first "trap door"
    that this bead is too light to fall through)
  THEN the color begins its ramp motion
  OTHERWISE it continues to move straight down.

The fit indicator f indicates that the time is right to "roll", and rolling continues until a mantissa reaches its basket. The variables needed to choreograph this motion transition are:
  $f \in \{\text{Continue}(0), \text{Switch}(1)\}$, the fit indicator;
  $m^s \in \{0,1\}$, a mantissa bit variable for sinking mantissas; and
  $m^r \in \{0,1\}$, a mantissa bit variable for rolling mantissas.

Figure 17:
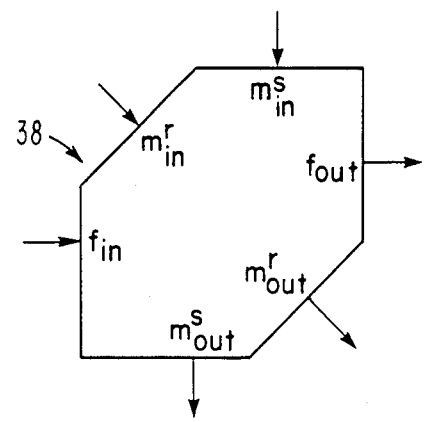
FIG. 17 is a diagram for explaining the operation of an individual sieve cell.

There is an input (in) and an output (out) version of each of the Boolean variables mentioned above. Only one of the $m^s$ and $m^r$ contain the mantissa bit in any sieve cell. FIG. 17 is a schematic of a sieve cell 38 which performs according to the above criteria. The ramp region 36 in FIG. 1 would be made up of a matrix of cells 38.

Figure 18:
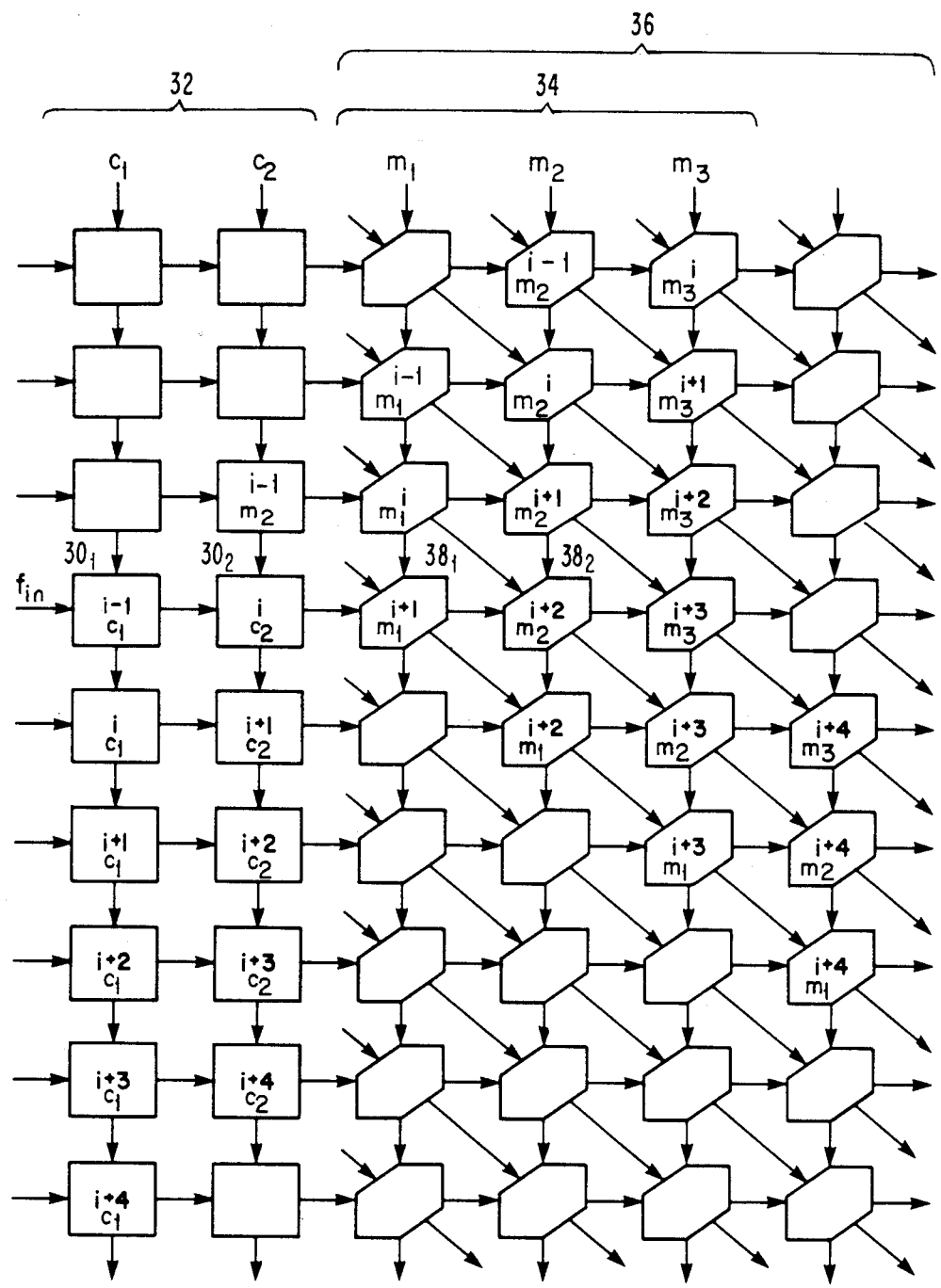
FIG. 18 is an illustration of the movement of a summand through a sieve formed of a matrix of cells, for $C=2$ and $M=3$.

We now focus on the time at which the motion is changed. The scheme implementing motion change is illustrated in FIG. 18, for C=2 and M=3. Each of the cells 30 in the characteristic decode region 32 of FIG. 18 is as shown in FIG. 16, with each of the cells 38 in the ramp region 36 of FIG. 18 being as shown in FIG. 17. We start our illustration at some time i with $f_{in}=1$ for cell $30_1$ in FIG. 18. The match in cell $30_1$ at time i causes $f_{out}$ from cell $30_1$ at time i to be "1". The match in cell $30_2$ at time i+1 causes $f_{out}$ from cell $30_2$ to be "1" at time i+1, indicating a characteristic match, and this signals a change of motion to each of the mantissa bits, in turn, starting with the next step. At time i+2, the leftmost mantissa bit $m_1$ will be provided at the roll output $m^r_{out}$ of cell $38_1$ and the "roll" signal will be provided to the input $f_{in}$ of the next cell $38_2$ in the same row. This process will continue until all of the mantissa bits of a single summand are rolling, at which time they will be vertically aligned and moving diagonally and the transition is complete.

The behavior of a "color" cell, or sieve region cell, can be expressed precisely in terms of its Boolean variables:

$$f_{out} \leftarrow f_{in}$$

If the fit indicator is false, then $m^s$ is transmitted down:

$$m_{out}^r \leftarrow m_{in}^s \cap f_{in}.$$

The ramping motion is continued if it has already begun. It begins if the fit indicator is true.

$$m_{out}^r \leftarrow m_{in}^r \cup (m_{in}^s \cap f_{in}).$$

Figure 19:
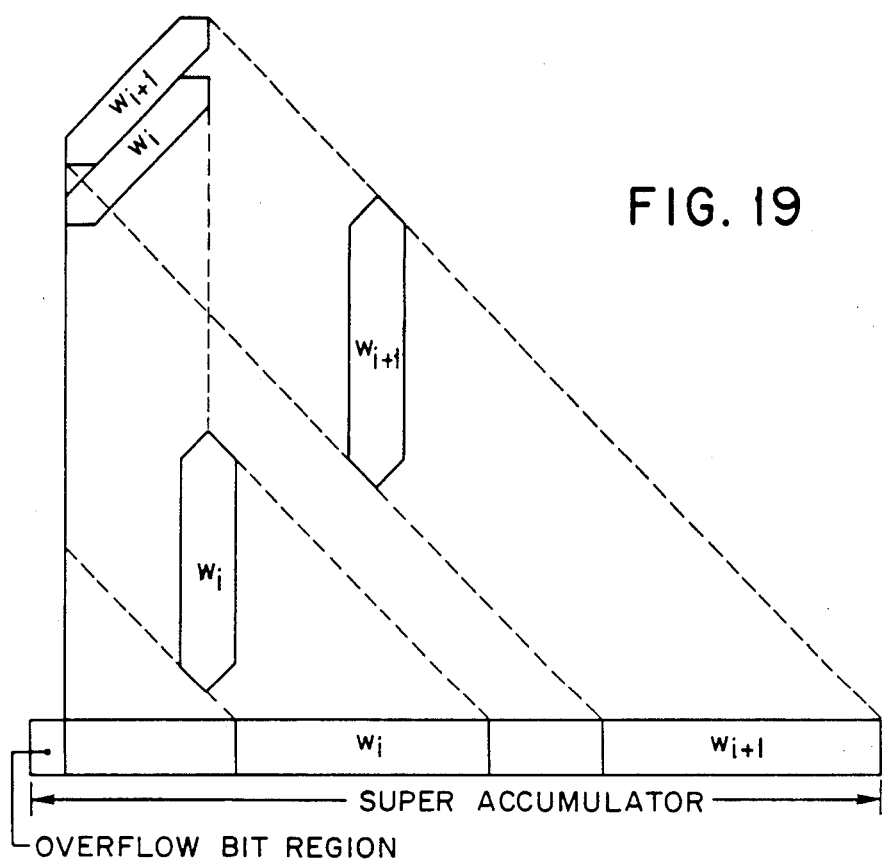
FIG. 19 is a diagram for explaining the ramp motion of two different mantissas $w_i$ and $w_{i+1}$, with $w_{i+1}$ being decoded before $w_i$ and therefore passing through $w_i$.
Figure 20:
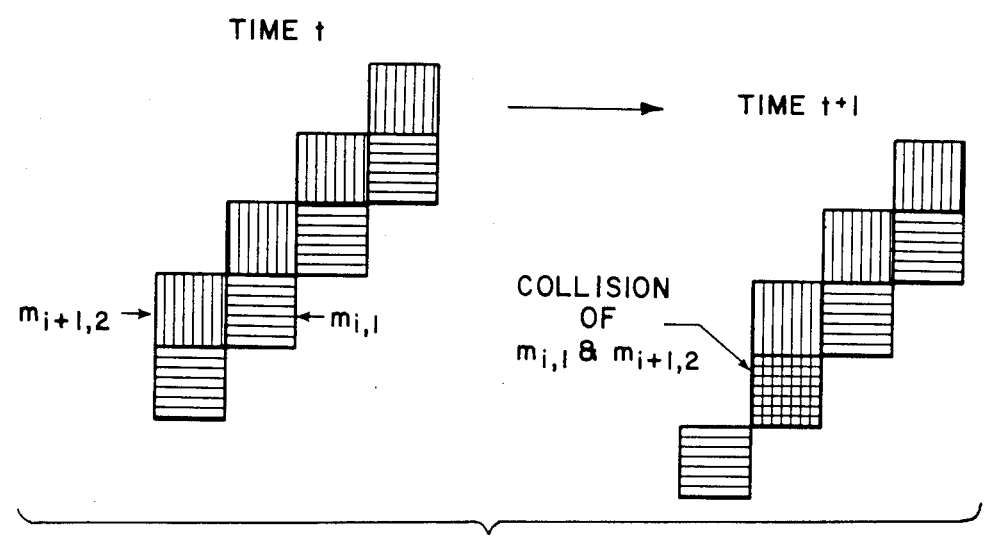
FIG. 20 illustrates a collision of bits, with summand $w_{i+1}$ being decoded and colliding with summand $w_i$ which has not yet been decoded.
Figure 32:
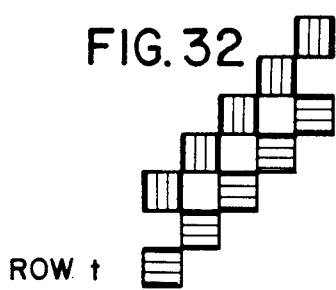
FIGS. 32–37 illustrate summands $w_i$ and $w_{i+2}$ being decoded at the same point in time, with the characteristic of $w_{i+2}$ being exactly two units smaller than that of $w_i$, whereby mantissa bits 1–3 of $w_i$ cohabit with mantissa bits 3–5, respectively, of $w_{i+2}$.
Figure 33:
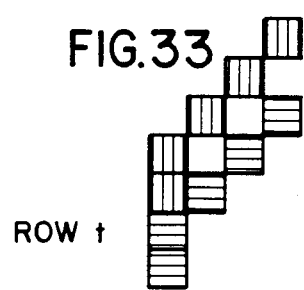
Figure 34:
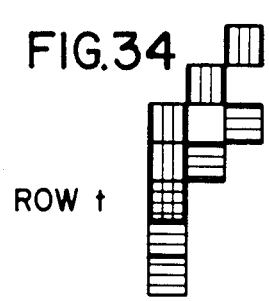
Figure 35:
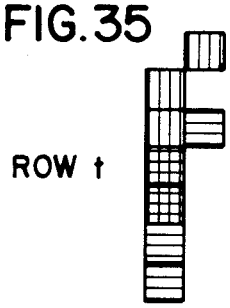
Figure 36:
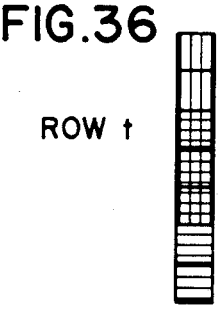
Figure 37:
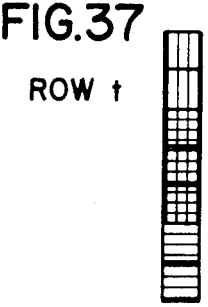
Figure 38:
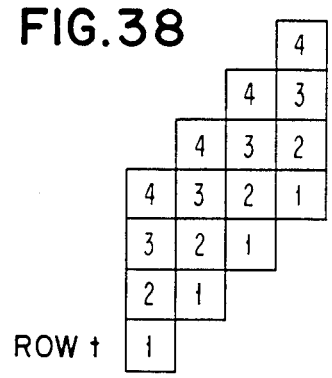
FIGS. 38–41 illustrate the case, for $M=4$, where successive summands have their characteristics decoded at the same time, with one cell cohabited by four mantissa bits.
Figure 39:
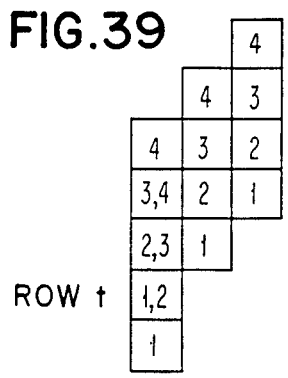
Figure 40:
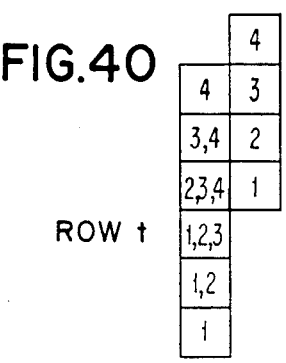
Figure 41:
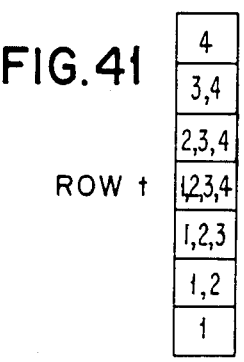
Figure 42:
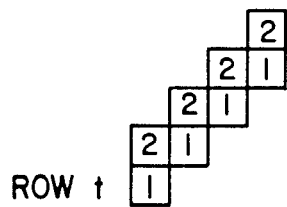
FIGS. 42–47 are a sequence of illustrations for explaining the coalescence technique of the present invention.
Figure 43:
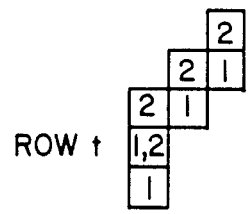
Figure 44:
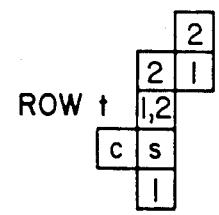
Figure 45:
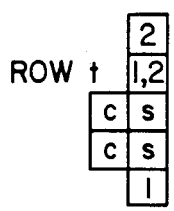
Figure 46:
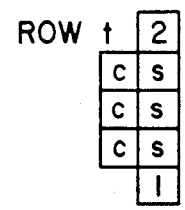
Figure 47:
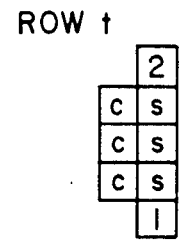

In the above discussion, mantissa bit motion changes were treated as through summands travel through the sieve one at a time. In fact, the sieve is pipelined and the summands are making their way through the sieve one after another, as indicated in FIG. 4. It is convenient to change notation here. $w_i$ will now denote the entire $i^{th}$ summand and $w_{i,j}$, j=1, ... M'C, will denote the $j^{th}$ bit of that summand. Similarly, $m_i$ will denote the mantissa of $w_i$ and $m_{i,j}$, j=1, ..., M, will denote the $j^{th}$ bit of $m_i$. If the characteristic of summand $w_{i+1}$ is smaller than that of summand $w_i$, then $w_{i+1}$ is a smaller number than $w_i$. From some j on, mantissa bit j of $w_j$, i.e., $m_{ij}$, is destined, therefore, to be placed to the right of $m_{i+1,j}$ in the super accumulator $\alpha_0$. As depicted in FIG. 19, the ramp followed by $w_{i+1}$ is above that followed by $w_i$, so that some of the mantissa bits of $w_{i+1}$ will simultaneously enter the same ramp cells occupied by the mantissa bits of $w_i$, thus resulting in a "collision". An example of this is illustrated in FIG. 20, with the mantissa bits of summand $w_i$ designated by horizontal hatching and those of summand $w_{i+1}$ designated by vertical hatching.

Assume that mantissa bit j of undecoded summand $w_i$, denoted $m_{ij}$, collides with mantissa bit j−1 of decoded summand i+1 ($m_{i+1,j-1}$). We consider two cases:

1. During the interval of time that the mantissa bits of $w_{i+1}$ are passing through those of $w_i$, $w_i$ remains undecoded. In this case, $w_i$ continues to descend while $w_{i+1}$ continues its ramp motion, both being unaffected by the collision. This sequence is shown in FIGS. 21-26, and is much like two wavefronts of light interfering with one another. At the point of contact, the wavefronts interfere. They emerge, however, quite unaffected, simply passing through one another.

2. During the interval of time that the mantissa bits of $w_{i+1}$ are passing through those of $w_i$, $w_i$ is decoded. In this case, the mantissa bits of $w_i$ will start their ramp motion. This sequence is shown in FIGS. 27-31. Surprisingly perhaps, in both cases the mantissa bits of the summands pass through one another unaffected by collision.

Such collisions are called transmission collisions, i.e., the mantissas are transmitted through each other.

It may occur, however, that two mantissa bits which collide on one cycle continue to collide on subsequent cycles. When this happens they are said to "co-habit" sieve cells. An example of this phenomenon is depicted in the sequence of FIGS. 32-37. Mantissa bit j of summand $w_i$ will co-habit with mantissa bit k of summand $w_{i+h}$ if and only if $j=k+h$ and the characteristic of $w_i$ is exactly h units larger than that of $w_{i+h}$.

Such a sieve cell can be co-habited by at most M mantissa bits. This bound is achievable. FIGS. 38-41 illustrate this worst case for M=4. The characteristic of $w_{i+1}$ is one unit larger than that of $w_{i+2}$. The characteristic of $w_{i+2}$ is one unit larger than that of $w_{i+3}$. The characteristic of $w_{i+3}$ is one unit larger than that of $w_{i+4}$. If the cells need to be able to transmit, in the worst case, M mantissa bits per cycle, then the area of such a sieve cell must be $\Omega(M)$.

This M-ary co-habitation can be eliminated, however, making possible a sieve cell of area O(1), as will now be explained. Since co-habiting mantissa bits will continue to occupy the same cell during their ramp motion, they are destined for the same bit position of the super accumulator, where they will be added. Thus, when mantissa bits co-habit, they may be added immediately, producing a sum mantissa bit and a carry mantissa bit. This process will hereinafter be called "coalescence", which is a form of signal combining. The sum mantissa bit continues to roll down the same ramp as the previously colliding mantissa bits, whereas the carry mantissa bit enters and rolls down the left neighboring ramp for higher order mantissa bits. Sum and carry mantissa bits, once produced, are just like any other rolling (i.e., decoded) mantissa bits and may themselves collide with other mantissa bits. FIGS. 42-47 illustrate the production of decoded sum and carry bits in the case of M=4 where successive summands decode simultaneously. Note that co-habitation is prevented by coalescence. That this is a general phenomenon can be seen by noting that the number of mantissa bits, including those produced by coalescence, that simultaneously enter a sieve cell is at most two.

Figure 48:
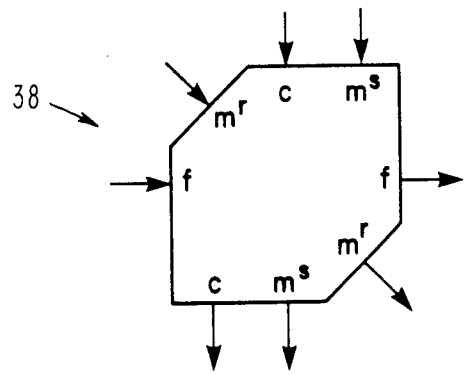
FIG. 48 is a diagram of an enhanced version of the cell of FIG. 17, with the addition of a carry bit c.

The resulting enhanced sieve cell 38 is shown in FIG. 48, and is designed to behave properly for both transmission and coalescence. A matrix of the cells 38 can process a pipeline of mantissa bits, regardless of the relative sizes of the characteristics. Moreover, the area of these sieve cells is O(1). The input-output equations for the sieve cell follow. (Variables on the right hand side of the assignment operator (←) are always the "in" version of the variable; those on the left are the "out"

versions. Hence, these subscripts may be dropped without ambiguity.)

The fit indicator continues to be transmitted without change to all mantissa bits:

$$f \leftarrow f.$$

Mantissa bits that are sinking continue to do so unless the fit indicator signals a motion change:

$$m^s \leftarrow \bar{f} \cap m^s.$$

The mantissa ramp bit is set to one if one of the following conditions hold (if two hold, then $m^r \leftarrow 0$ and $c \leftarrow 1$):

1. The summand receives the decode (fit) signal on this cycle and $m^s$ is one. Then $m^s \leftarrow 0$; $m^r \leftarrow 1$, and the bit starts to roll.
2. A rolling mantissa bit is received (this may be the sum bit of a previous collision).
3. A carry bit of one is received due to a coalescence in the sieve cell above on the previous cycle. (An analysis of the operation will reveal that, for all ramp region cells, $m^r$ and $c$ are never both set to "1" during the same cycle. Thus, conditions 1 and 3 cannot occur at the same time.)

Each of these conditions is reflected in a term below. All are then added modulo 2 ($\oplus$):

$$m^r \leftarrow (f \cap m^s) \oplus m^r \oplus C$$

The carry bit is set under two conditions:

1. There is a collision of two decoded mantissa bits, (the first term below),
2. There is a collision of a mantissa bit ($m^r$), which may be the sum bit of a previous collision, and a carry bit. This case is expressed as the second term below. The case of a just-decoded mantissa bit and a carry bit colliding is not possible, as described above.

$$c \leftarrow (f \cap m^s \cap m^r) \cup (m^r \cap c)$$

It is important to note that the arrival time of a mantissa bit at the super accumulator is not affected by decoding or collisions. Motion of mantissa bits obeys the law:

$$\text{rate} \times \text{time} = \text{distance}$$

The vertical distance to the super accumulator is measured in rows of sieve cells. The arrival time of mantissa bits (not the arrival place) is unaffected by decoding and collisions because the vertical rate of mantissa bits is unaffected by these phenomena. The rate of decent is 1 row/cycle. First, this rate is unaffected by decoding; the change to ramp motion only adds a horizontal component to the mantissa's velocity. Second, transmission collision is designed to leave the velocity of the participating mantissa bits unchanged. Finally, coalescence produces two mantissa bits, but each has a vertical velocity equal to that of the colliding bits, i.e., 1 row/cycle. Thus, the time of arrival of mantissa bits at the super accumulator, including those resulting from coalescence, is unaffected by decoding and collisions.

This feature is exploited in synchronizing the unloading of the super accumulator, as will be discussed later.

Up to this point, we have described a cellular algorithm and architecture that accepts as input an unsigned floating point number, and transmits its mantissa to the proper portion of the super accumulator. The rate at which inputs are processed is one floating point number per cycle. The chip area of the sieve is $O((2^C+M)^2)$. The ratio of chip area to summand input rate (A/U) is thus $O((2^C+M)^2)$. This may seem unduly large, since, although not cellular, a tree network accomplishing the same result would have an area and an A/U ratio of $O((2^C+M) \log (2^C+M))$. Thus, it would be desirable to enhance the architecture/algorithm of the system of the present invention to increase the throughput.

In the preferred embodiment, the architecture/algorithm is enhanced such that the throughput will be not one number per cycle, but $(2^C+M)/M$ numbers per cycle. The area remains $O((2^C+M)^2)$, however, so its A/U ratio is $O(M(2^C+M))$. Unlike the tree network, this architecture is cellular.

FIG. 49 illustrates, in enlarged form, the basic sieve arrangement as shown in FIG. 1, with the characteristic decode region I (reference character 32), where the characteristics are matched and the appropriate ramp selected, an M-bit wide sinking region II (reference character 34) where mantissa bits sink straight down and where the transition to ramp motion also occurs, and a ramp region III (reference character 36) where the mantissas are rolling down their proper ramps. The super accumulator $a_0$ of length $2^C+M$ is the destination of the mantissas. The sinking region is situated directly above the M high-order cells of the super accumulator. These cells are numbered $2^C+M-1$, $2^C+M-2$, ..., $2^C$ from left to right. Mantissas that are destined for this highest-order slot, denoted $[2^C+M-1, 2^C]$, (those with the largest allowable characteristic $2^C-1$) simply sink straight down, never rolling onto any ramp.

Figure 52:
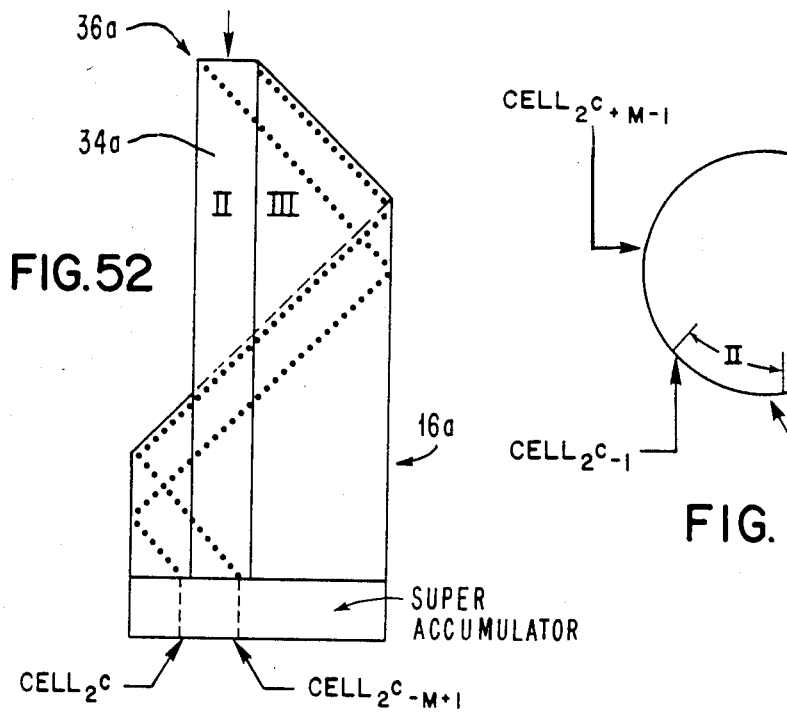
FIGS. 52 and 53 are front and top views, respectively, of a second cylindrical sieve offset with respect to the sieve of FIGS. 50 and 51.
Figure 53:
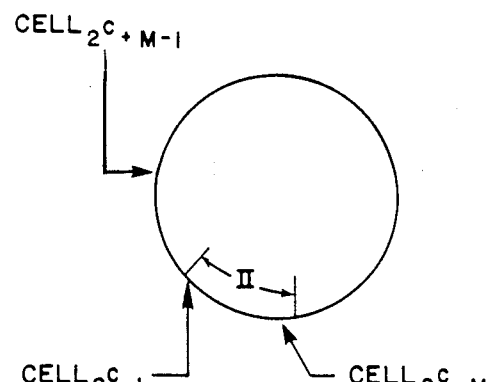
Figure 54:
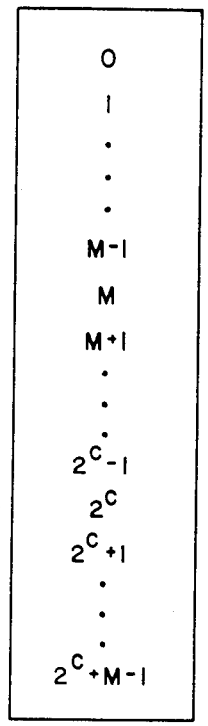
FIGS. 54 and 55 are illustrations of the sequence of characteristic values employed in the characteristic decode regions of the sieves of FIGS. 50 and 52, respectively.
Figure 55:
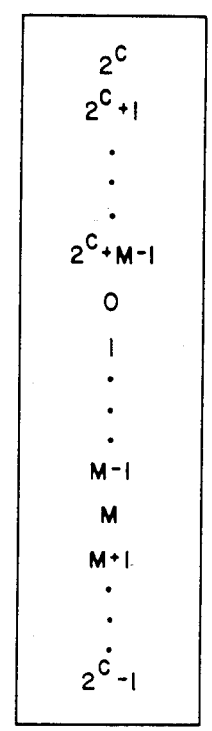

The enhancements to this design will now be described. First imagine that regions II and III of the sieve are curved into a cylinder, as shown in the front view of FIG. 50 and the top plan view of FIG. 51. Imagine also that the characteristic decode region I is folded so that it stands out more or less orthogonally to the cylinder. A second sieve 16a is pictured in FIGS. 52 and 53 and may be situated such that its sinking region 34a is over super accumulator slot $[2^C-1, 2^C-M+1]$. Viewed from above, the sinking region 34a of the second sieve 16a is exactly M positions counterclockwise with respect to the sinking region 34 of the sieve 16 depicted in FIGS. 50 and 51. In the sieve 16a, mantissas that are destined for the super accumulator slot $[2^C-1, 2^C-M]$ are positioned there by motion entirely within its sinking region 34a, never using any ramps. To reach any other slot requires some ramp motion in the ramp region 36a of the sieve 16a. In particular, for example, a mantissa destined for slot $[2^C, 2^C-M]$ is positioned with ramp motion. The movement of such a mantissa is sketched in FIG. 52. The motion of the mantissa, as indicated in FIG. 52, may appear to change directions, being reflected at the left and right boundaries of the sieve. In fact, its motion is a steady counterclockwise roll down a spiral ramp. FIG. 54 shows the sequence of characteristics corresponding to the successive levels of the characteristic decode region 32 of sieve 16. FIG. 55 shows the corresponding sequence for the different levels of the characteristic decode region 32a of the second sieve 16a.

Figure 56:
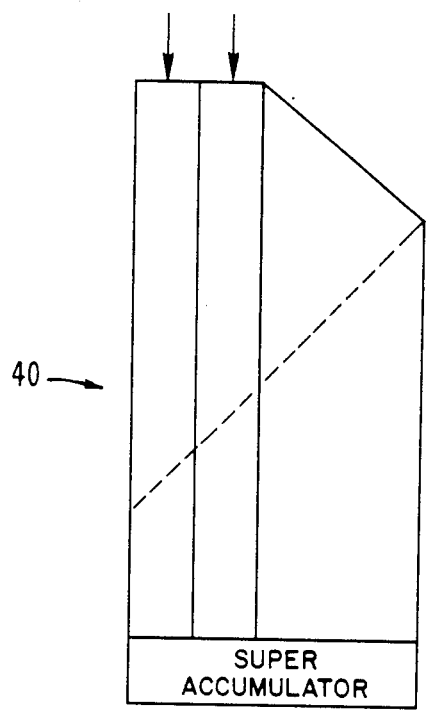
FIGS. 56 and 57 are front and top views, respectively, of a sieve with two sinking regions achieved by superposition of the sieves of FIGS. 50 and 52.
Figure 57:
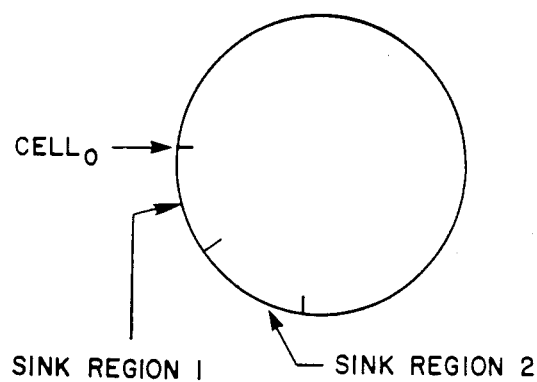

Now imagine a sieve with two sinking regions. That is, a sieve into which two numbers enter concurrently. FIG. 56 depicts such a sieve 40 in front view, while FIG. 57 illustrates the sieve 40 in top view. The sieve 40 of FIGS. 56 and 57 is essentially the superposition of sieves 16 and 16a from FIGS. 50 and 52, respectively. In this superposition sieve 40, the sinking regions and ramp regions overlap, with the following consequences. The fit indicator f of the first characteristic decode region functions to change sinking motions to rolling motions, and is of significance only in the first sinking region. Similarly, the second fit indicator of the second characteristic decode region will only be of significance in the second sinking region. Propagation of each fit indicator will terminate at the right-hand boundary of its respective sinking region.

Figure 58:
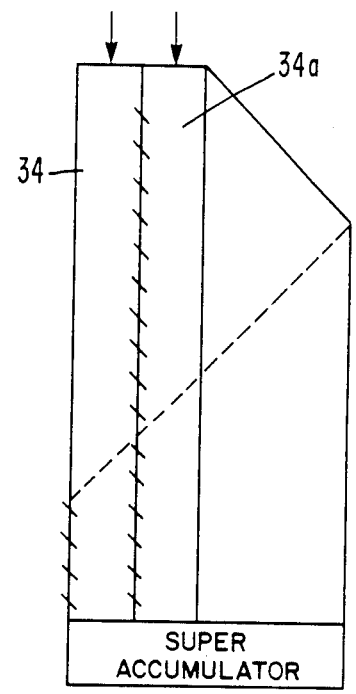
FIG. 58 is a view similar to that of FIG. 56, with the diagonal dashes along the left boundary of the two sinking regions indicating parts of the left boundaries of those regions which can receive left-entering rolling mantissas.

Consider the collisions that now are possible. A cell in the sinking region, as before, may have sinking mantissa bits entering it from above, and rolling mantissa bits entering it from the northwest diagonal. Unlike sieve 16, however, some of the cells in the leftmost column of the sinking region may be entered by rolling mantissa bits. The coalescence mechanism, previously described, functions correctly even in this new environment. FIG. 58 indicates, by diagonal dashes, those parts of sinking regions 34 and 34a that may have rolling mantissa bits entering their leftmost column of cells. Thus, in this new sieve 40, two pipelines of mantissas can be positioned concurrently.

Imagine finally that the cylindrical sieve is further enhanced so that the circumference is populated with sinking regions. Since each sinking region is M bits wide, the cylindrical sieve can have as many as $$S = (2^C + M)/M$$

concurrently operating disjoint pipelines of mantissas. Assume that the cylindrical sieve is supplied with these pipelines, and that these disjoint pipelines (sinking regions) cover the sieve. That is, assume that $(2^C+M)/M$ is an integer. Let such a sieve be called an MDSR (Multiple Disjoint Sinking Region) sieve. Such a sieve 42 is depicted in front view in FIG. 59 and in top view in FIG. 60. The sieve 42 has disjoint sinking regions $34_i$, $i = 1, \ldots, S$, each having a corresponding characteristic decode region $32_i$. The sieve 42 is cellular, and has area $O((2^C+M)^2)$.

It will be seen that the cellular coalescence mechanism functions correctly even in a MDSR sieve, since the number of mantissa bits, including those produced by coalescence, that simultaneously enter a MDSR sieve cell is at most two. Let $\mu_{ij}$ denote the sieve cell in the $i^{th}$ row and $j^{th}$ column. Let $\mu_i$ denote the $i^{th}$ row of sieve cells. Since the sieve geometry is cylindrical, $\mu_{i,j+2^C+M} = \mu_{i,j}$. (Later on we shall use the notation $\mu_{ij}.b$ to denote the value of the Boolean variable b corresponding to the cell $\mu_{ij}$.) Prior to decoding of the first mantissa, all motions are vertical and collisions cannot occur. A collision of two bits is a transition or a coalescence, and in either case, two bits result, each moving in one of the two manners just noted. Thus, in none of these cases can a single cell supply two bits to another cell. No other possibilities for motions or collisions exist. To see this, suppose that three (or more) bits arrive in cell $\mu_{ij}$ and for the first time. All previous motions having been described, it is seen that of the three bits arriving in cell $\mu_{ij}$, two come from cell $\mu_{i-1,j}$ (i.e., from above), or two come from cell $\mu_{i-1,j-1}$ (i.e., from the upper-left). This is a contradiction since, prior to the first presumed triple collision, no cell can supply two bits to another cell.

The A-Pipeline

Up to this point in the description, the process performed by the invention may be viewed as the conversion from floating point representation to fixed point representation, and the next step is accumulation. Accumulation is done in fixed point in order to avoid loss of information (i.e., rounding errors). The only difference between the accumulator of this invention and a typical accumulator is that the present accumulator is much bigger. It has $L = 2^C + M + F$ bits (where it is anticipated that typically F and C will both be 9 and M will be 48, so that $L = 569$), so that it can add numbers that are very large to those that are very small, all with no loss of information.

Figure 61:
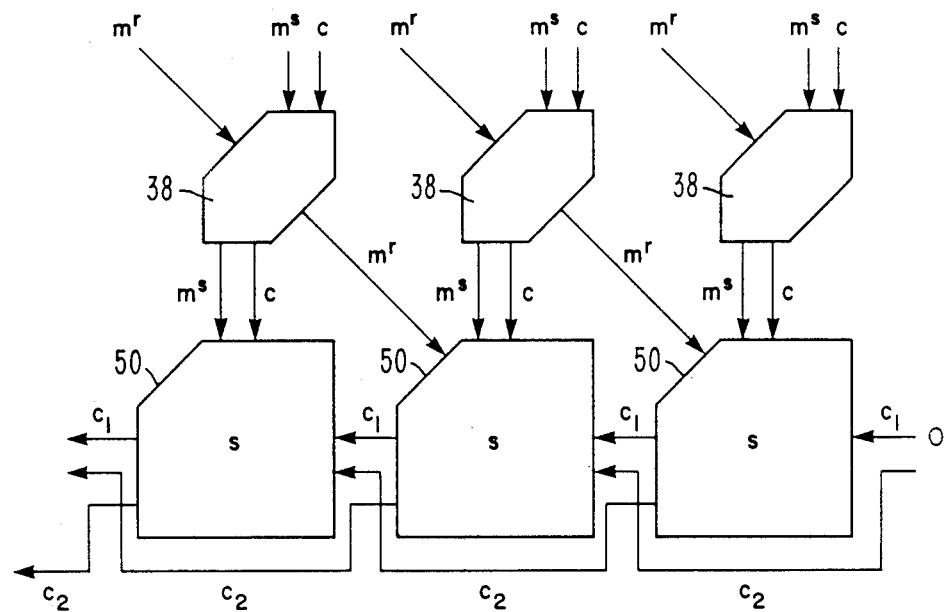
FIG. 61 is an illustration of three low-order cells in a super accumulator, together with three sieve cells which feed them.

It is desirable that the basic super accumulator consist of a linear array of L identical cells. FIG. 61 illustrates such a scheme. In this scheme, the $m^r$, $m^s$, and c bits are outputs from sieve cells 38 and inputs to accumulator cells 50. Recall that at most one of the $m^s$ and c outputs of any sieve cell 38 will have value "1" during any particular cycle. Given these inputs, an accumulator cell 50 must produce a sum bit and a carry bit. The sum bit is an input of the same accumulator cell on the subsequent cycle (hence the term accumulator). The carry bit is an input of the higher-order neighboring accumulator cell. Thus, we have the possibility of four inputs with value of "1". This case requires a second-order carry bit output. The second-order carry bit is an input of the accumulator cell that is two positions to the left.

Figure 62:
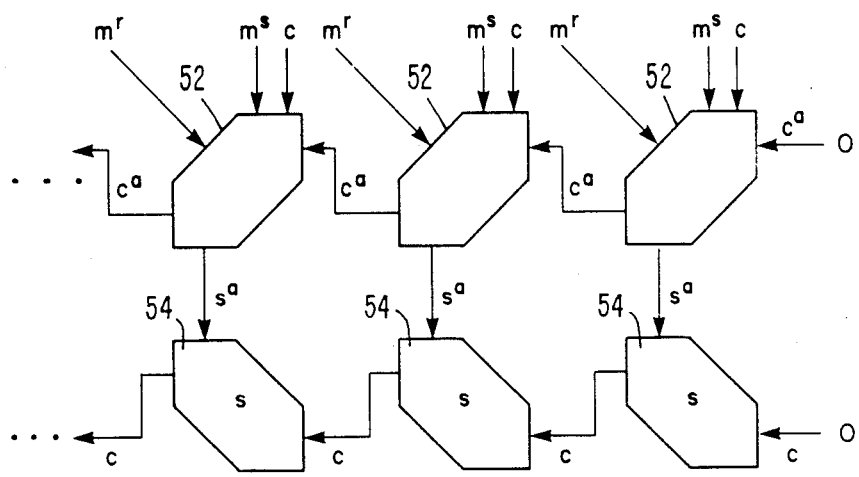
FIG. 62 is a schematic of an improved version of the three low-order cells in the super accumulator and three bottom-row sieve cells feeding them, with the bottom row sieve cells being enhanced to avoid second-order carries in the accumulator.

In order to avoid the second-order carry, the scheme should be modified by augmenting the sieve with a special row of cells at its base. FIG. 62 illustrates this modified scheme. First, note that the bottom row of sieve cells 52 is now different from the rest, with each cell 52 in the bottom row producing a sum bit $s^a$ and a carry bit $c^a$. The sum bit $s^a$ is an input to the modified accumulator cell 54, and the carry bit $c^a$ is an input to the higher-order neighboring sieve cell. These new sieve cells 52 have four inputs: $m^r$, $m^s$, and c from the higher row of sieve cells, and $c^a$ from the lower-order (i.e., right-hand) neighbor of the cell. Since only one of $m^s$ and c can be "1", at most three inputs can be "1". Thus, the $s^a$ and $c^a$ bits are sufficient to characterize the output of a bottom-row sieve cell 52. Each super accumulator cell 54 now has three inputs $s^a$, s, and c, and each produces two outputs s and c.

The input-output equations for each bottom-row sieve cell are as follows.

$$s^a \leftarrow m^r \oplus m^s \oplus c \oplus c^a$$

$$c^a \leftarrow (m^r \cap m^s) \cup (m^r \cap c) \cup (m^r \cap c^a) \cup (m^s \cap c^a) \cup (c \cap c^a)$$

For the low-order bottom row sieve cell, $c_{in}{}^a \equiv 0$.

The input-output equations for each super accumulator cell are as follows. The sum bit s is produced and saved for the subsequent cycle:

$$s \leftarrow s \oplus s^a \oplus c$$

The carry bit c is produced and sent to the higher-order neighbor:

$$c \leftarrow (s \cap s^a) \cup (s \cap c) \cup (s^a \cap c)$$

For the low-order accumulator cell, $c_{in} \equiv 0$. The bottom row of sieve cells is itself an accumulator, since it accumulates the carry bits $c^a$. This fact comes into play in completing one sum and starting another, as will be discussed below.

Figure 63:
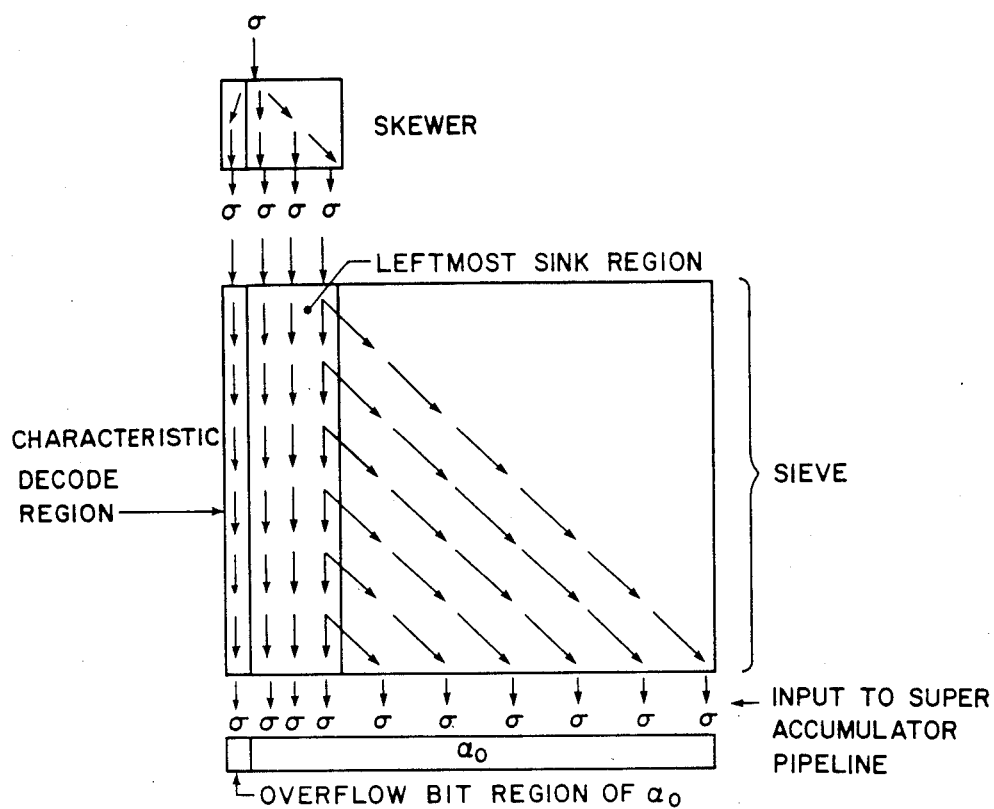
FIG. 63 is an illustration for explaining replication and transmission of the end-of-sum signal $\sigma$.

On the cycle following the entry of the last summand mantissa(s) in the skewer(s), an initialization word is entered into each skewer. The initialization word consists of a zero mantissa and an appropriate characteristic. The characteristic depends on the skewer and is such that each initializing mantissa word descends through its corresponding sinking region and reaches the super accumulator without being decoded. On the cycle following the entry of the initializing words, an end-of-sum signal $\sigma$ enters the leftmost skewer. It enters the skewer at the cell where the most significant mantissa bit enters, as is generally illustrated in FIG. 63. The "leftmost" skewer is arbitrarily chosen as that skewer whose outputs enter the cells $\mu_{1,j}$, $j=1, \ldots, M$, of the cylindrical sieve. $\sigma$ is set to "1" on the cycle following the entry of the last bit of the initializing zero word, and is set to "0" on all other cycles.

The leftmost skewer replicates and propagates the $\sigma$ signal, so that on the cycle following entry into the sieve of the last bit of the initializing zero mantissas, the $\sigma$ signal simultaneously enters the sieve cells $\mu_{1,j}$, $j=1, \ldots, M$, as well as the top-most row of cells in the leftmost characteristic decode region. The details of skewer cell design for accomplishing this $\sigma$ propagation will be self-evident from the following description of $\sigma$ propagation in the sieve.

The summands of a new sum may begin entry into the skewers on the same cycle as the end-of-sum signal. When an end-of-sum signal $\sigma=1$ reaches the bottom row of sieve cells, the $m^r$, $m^s$, and c bits are all zero, resulting from the zero mantissas. Thus, during this cycle, each bottom-row sieve cell has at most one input of value "1", i.e., the input $c_{in}{}^a$, the "1" value of which may have resulted from the addition of the last bit of the last true summands entering the bottom row. Consequently, for each such cell, $c_{out}{}^a = 0$ and $s_{out}{}^a = c_{in}{}^a$. In this way, the bottom row of sieve cells is unloaded and re-initialized.

Figure 64:
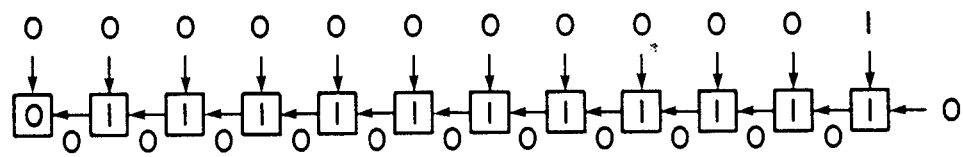
FIG. 64 is an illustration of the propagation of a carry bit through the entire length of the super accumulator.

Let N denote the number of summands, and T the cycle during which the first $s^a$ bit enters the super accumulator. Then including entry of the initializing zero mantissas, the last $s^a$ bit is accumulated during cycle $T + \lceil N/S \rceil + M - 1$, where $\lceil x \rceil$ designates the smallest integer greater than or equal to x. Including this last cycle, however, carry bit propagation, in the worst case, can take L additional cycles. An instance of this worst case is illustrated in FIG. 64.

It is desirable that the systolic super summer be highly pipelined. After one set of summands are fed into the super accumulator, processing of another sum should immediately begin. It is thus necessary to unload the super accumulator and reset it, even before the L carry resolution cycles have elapsed. This requirement results in a pipeline of super accumulators whose purpose is the completion of carry resolution, among other sum finalizing tasks. This pipeline of accumulators is hereafter referred to as the A-pipeline.

To determine the worst case requirements for the number of accumulators in the A-pipeline, it is first noted that a sum may consist of no fewer than two summands. If $N=2$ and $S \geq 2$, then the first bit of a succeeding sum would arrive at the super accumulator $M+1$ cycles after this minimum length sum started its arrival to the super accumulator. (This includes a cycle for the clearing zero mantissas between sums.) Thus, M is the fewest number of cycles for which any sum will occupy the initial super accumulator. By repeating this worst case (shortest) sum, we obtain the worst case (longest) pipeline of accumulators needed to resolve carry bit propagation: $(2^C + M)/M$ super accumulators. Again, these accumulators are needed in addition to the initial accumulator.

Figure 65:
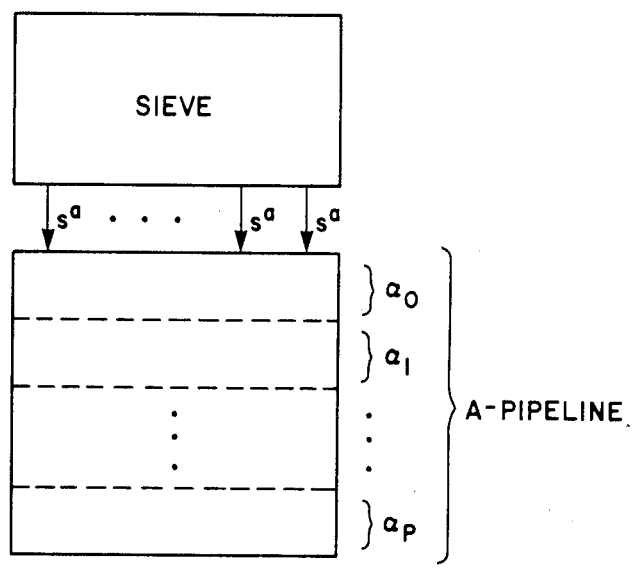
FIG. 65 is a diagram for explaining the A-pipeline arrangement.

Let the number of super accumulators be denoted by $P = (2^C + M)/M + 1$. For what are anticipated to be the typical values of C and M, we have $P = (2^9 + 48)/48 + 1 = 13$. The apparatus is shown schematically in FIG. 65.

In the following discussion, let the the $i^{th}$ super accumulator be denoted by $\alpha_i$, $i = 0, \ldots, P$, and the $j^{th}$ cell of the $i^{th}$ super accumulator by $\alpha_{i,j}$, $j = 1, \ldots, L$. The index j enumerates cells from right to left in increasing order of significance.

The synchronization of the A-pipeline will now be discussed. For $0 \leq i \leq P - 1$, the entire $\alpha_i$ accumulator is transferred to $\alpha_{i+1}$ in one cycle. This transfer includes the contents of the overflow bit region of each accumulator. This is accomplished by replicating and transmitting the end-of-sum signal $\sigma$, so that it reaches all cells in a particular accumulator and its overflow region during the same cycle. It reaches all cells in $\sigma_0$, in particular, exactly one cycle after the last $s^a$ bit reaches its $\alpha_0$ cell. Moreover, $\sigma$ must be transmitted without broadcasting. The sieve apparatus of this invention is used to replicate and transmit $\sigma$ in a cellular way. FIG. 63 illustrates the replication and transmission of $\sigma$ through both the skewer and the sieve cells. (Although the sieve is in fact cylindrical as discussed above, it is illustrated in a planar form for simplicity.) From FIG. 63, one can see that it is only the mantissa cells in the "leftmost" sink region (cells $\mu_{i,j}$, $i = 1, \ldots, 2^C$, $j = 1, \ldots, M$) and the corresponding leftmost characteristic decode region that need to replicate $\sigma$, since all cells in the lower triangle of the sieve simply transmit $\sigma$ diagonally down. The sinking region cells $\mu_{i,j}$, $i = 1, \ldots, 2^C$, $j = 1, \ldots, M$, as well as the cells of the "leftmost" characteristic decode region, are modified to include a $\sigma$ state bit with the following input-output equation.

$$\sigma^s \leftarrow \sigma^s$$

The interface cells $\mu_{i,M}$, $i = 1, \ldots, 2^C$, i.e., the rightmost column of sieve cells in the leftmost sinking region, have an additional $\sigma$ state bit with the following input-output equation.

$$\sigma^r \leftarrow \sigma^s$$

Figure 66:
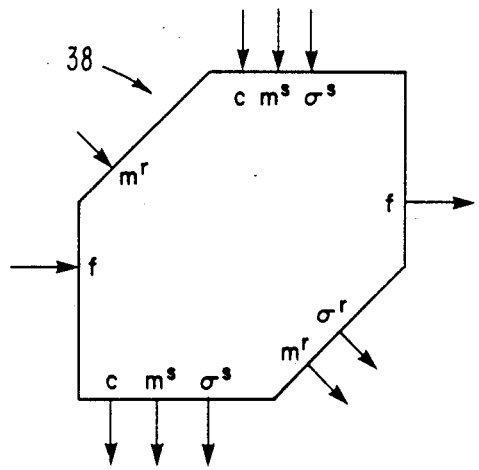
FIG. 66 is a cell diagram of cells in the interface column of the left most sink region, with the bottom-row sieve cell (not shown) being provided with an input and output $c^a$.

These interface cells are as illustrated in FIG. 66. The lower triangle of remaining sieve cells simply transmit $\sigma$ diagonally. A cell diagram for these lower triangle cells is shown in FIG. 67, and they have the following new transmission equation:

$$\sigma^r \leftarrow \sigma^r$$

Figure 67:
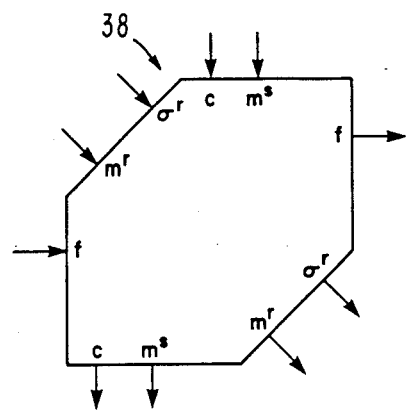
FIG. 67 is a cell diagram for the remaining cells in the lower triangle of the sieve region of FIG. 63, with input and output $c^a$ bits being also present in the bottom-row sieve cell (not shown)

The cells in the upper triangle of the sieve may be the same as is shown in FIG. 67, with the $\sigma$ inputs and outputs merely left unused.

At the bottom of the sieve, $\sigma$ propagates through the pipeline of accumulators. If the cells of $\alpha_i$ receive a value of $\sigma$ during cycle T, then the cells of $\alpha_{i+1}$ receive that value of $\sigma$ during cycle $T + 1$. The cells of $\alpha_i$ must transfer their contents to $\alpha_{i+1}$ when receiving a $\sigma = 1$, and otherwise behave as previously described. A cell diagram for an $\alpha_i$ accumulation cell is given in FIG. 68. A schematic illustration of the carry resolution pipeline is given in FIG. 69. Boolean variables s and c now each have two varieties: one for normal operation (when $\sigma=0$), and a $\tau$ variety for register transfer $s^\tau$ and $c^\tau$ (when $\sigma=1$). The input-output equations for a general cell $\alpha_{ij}$ follow.

The transfer signal $\sigma$ is simply transmitted:

$$\sigma \leftarrow \sigma.$$

The sum bit is computed as before, when no register transfer is occurring. When a register transfer is occurring, the sum bit is computed from the incoming transfer variables. Note that the $s^a$ bit exists only for $\alpha_0$:

$$s \leftarrow (\overline{\sigma} \cap (s \oplus s^a \oplus c)) \cup (\sigma \cap (s^a \oplus c^\tau)).$$

The transfer version of the sum bit is zero unless a transfer is occurring:

$$s^\tau \leftarrow \sigma \cap (s \oplus s^a \oplus c).$$

The carry bit is computed as before, when no register transfer is occurring. When a register transfer is occurring, the carry bit is computed from the incoming transfer variables:

$$c \leftarrow (\overline{\sigma} \cap ((s \cap s^a) \cup (s \cap c) \cup (s^a \cap c))) \cup (\sigma \cap s^\tau \cap c^\tau).$$

The transfer version of the carry bit is zero unless a transfer is occurring:

$$c^\tau \leftarrow \sigma \cap ((s \cap s^a) \cup (s \cap c) \cup (s^a \cap c)).$$

Boundary conditions now are noted. For all i, j, $\alpha_{i,0}.c_{in} = \alpha_{0,j}.c_{in}^\tau = 0$, where $\alpha_{i,j}.c$ denotes the carry bit of the $j^{th}$ cell of the $i^{th}$ super accumulator, and for all j, $\alpha_{0,j}.s_{in}^\tau = 0$. In these boundary conditions, the "in" subscripts refer to the input version of a variable.

The Normalizing Region—Final Encoding of the Sum

The final encoding of the sum consists of a number of processes. These are normalization (the left shifting of a sum so as to remove leading zeros) and characteristic encoding (the corresponding determination of the exponent of the sum). Both of these processes may be started when a sum is pushed down to $\alpha_1$. Carry propagation will not, in general, be completed when this occurs. Thus, normalization and characteristic encoding are combined with carry resolution. The last step of final encoding is rounding. Rounding is usually not performed until the other three processes are terminated. However, the summer of this invention also performs rounding while carry resolution is still in progress, although not before the formal normalization and characteristic encoding are themselves completed. (As described earlier, the original sum may be divided into two unsigned subsums corresponding to the positive and negative terms. The two completed subsums are to be combined upon completion of the formal normalization and characteristic encoding, but before rounding. This modification would be implemented in a straightforward manner, and the summing of signed summands will be discussed below.) Of course, these four processes are multiplexed in the interest of performance.

For clarity and ease of explanation, the description will proceed in a stepwise manner. First, there will be described a non-pipelined design for normalization and characteristic encoding, under the assumption that all carries are resolved. There will then be incorporated those changes necessary to ensure its proper function in the presence of carry resolution. Rounding will then be introduced and corresponding changes once again made in the apparatus to ensure the proper functioning of all of these interrelated processes. With this, the non-pipelined design will be complete and a last step is taken to make the design cellular, which last step will require further design changes. Recall that the device output is to be a floating-point number in $R(b,\overline{M}, e1, e2)$. Because of the length of the accumulators, the actual sum may be a fixed-point number whose floating-point representation in $R(b,\overline{M}, ., .)$ has an exponent outside of the interval [e1, e2]. This constitutes a condition of overflow of the apparatus, and in this case a default output is to be made.

For the moment it will be assumed that all carries are resolved. To proceed, we introduced a counter $$\text{exp:counter}[1 .. C],$$

called "exp" with capacity C, and a register $$\text{mant:register}[1 .. \overline{M}],$$

called "mant" with $\overline{M}$ cells. Recall that $L = 2^C + M + F$, so that $\alpha_{1,L}$ denotes the leftmost (i.e., highest order) cell in the super accumulator $\alpha_1$. The method for obtaining a normalized mantissa, and for encoding the characteristic, then can be described by the following procedure.

```
{
exp:counter[1 ... C];        /* contains characteristic
                                when done */
mant:register[1 ... M̄];      /* contains mantissa when
                                done */
i:integer;
exp ← 2^C − 1;
While α_{1,L} · s = 0 do
    {
    exp ← exp − 1;
    shiftleft super accumulator;
    };
for i ← 1 to M̄ do
    {
    shiftleft mant;
    mant[1] ← α_{1,L} · s;
    shiftleft super accumulator
    }
}
```

FIGS. 70 and 71 illustrate this normalization/characteristic encoding procedure, with FIG. 70 showing the contents of the various registers before normalization and FIG. 71 showing the registers after normalization.

Figure 72:
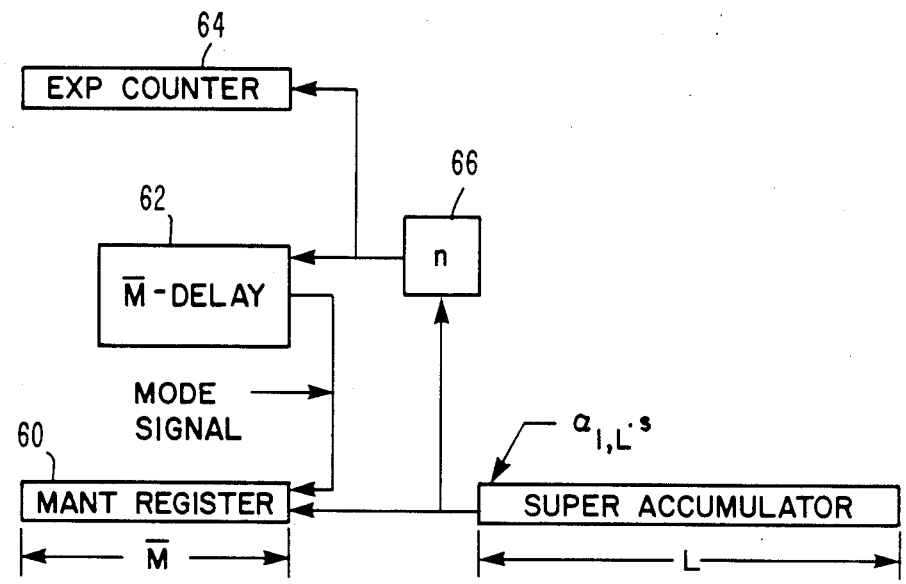
FIG. 72 is a schematic illustration for explaining the normalizaton and characteristic encoding hardware.
Figure 73:
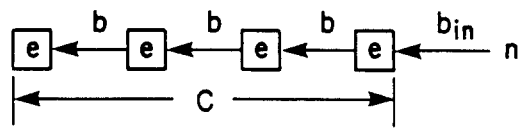
FIG. 73 is a more detaled illustration of the counter 64 in FIG. 72, with b indicating a borrow.

There will now be described an implementation of this procedure in cellular hardware. A schematic of the apparatus is given in FIG. 72. In addition to the super accumulator, the hardware includes the mant register 60 which holds the normalized mantissa, and an $\overline{M}$-delay element 62 used to time the generation of a mode signal. This mode signal p terminates the shifting of super accumulator bits into the mantissa register. The hardware further includes a C-cell exp counter 64, shown in more detail in FIG. 73, which will hold the characteristic, and finally a register 66 for a "normalization" variable n which is changed from 1 to 0 when the s-bit of $\alpha_{1,L}$ is "1" (hereafter denoted $\alpha_{1,L}.s=1$). That is, n indicates whether or not all leading zeros have been shifted out of the super accumulator.

To simplify synchronization and control of the super accumulator, the shift is implemented unconditionally, i.e., the condition "while $\alpha_{1,L}.s=0$" in the above procedure is dropped, so that the contents of $\alpha_1$ are being shifted left on every cycle. To further simplify control, the s-bits that are shifted out of the super accumulator are shifted into the mant register. There is no computed start signal for this. Initialization of variables will be described when treating the pipelining of the design. For the moment, assume that the normalization state variable n is initially "1". As long as $\alpha_{1,L}.s=0$, n retains its "1" value, indicating the unnormalized state. When $\alpha_{1,L}.s=1$, n←"0".

The value of n is used as a decrement signal to the exp counter 64, which is initially $2^C-1$. Each cell in the counter 64 contains a bit denoted by e. The counter 64 is a simple cellular (down) counter of length C, so that borrow propagation surely is complete C cycles after the mantissa is normalized in the super accumulator. The input-output equations of the cells of counter 64 are as follows.

$$e \leftarrow e \oplus b.$$

$$b \leftarrow \bar{e} \cap b.$$

For the low-order cell of counter 64, $b_{in}=n$.

The loading of the mantissa into the mant register will now be described. The mant register 60 is a linearly connected array of cells. Each cell has two modes of operation: the "shift" mode and the "hold" mode, governed by a mode signal p which takes on these two values. Each cell initially is in "shift" mode. The array of mant cells consequently acts as a left shift register, and $\alpha_{1,L}.s$ is being shifted into the low-order mant cell. When normalization begins, the leading zeros of $\alpha_1$ are shifted into the register 60. Once the mantissa is normalized in $\alpha_1$, the mant register 60 starts to receive the normalized mantissa bits. In other words, the mant register should stop shifting left exactly $\overline{M}$ cycles are the mantissa is normalized in the super accumulator, because, precisely at that point, the mant register 60 contains the correct mantissa. A mode signal of "hold" is then broadcast to all cells of register 60 exactly $\overline{M}$ cycles after the super accumulator is normalized, i.e., exactly $\overline{M}$ cycles after n is changed to the "normalized" state (n=0).

The generation of the mode signal will now be described, followed by transformation of the mant register operation from one which requires a broadcast to one that is strictly cellular.

Initially, n=1. Once the "normalized" indicator n is put in the normalized state, it stays there. Thus, $$n \leftarrow n \cap \alpha_{1,L}.s.$$

The mode of the cells in register 60 switches to "hold" exactly $\overline{M}$ cycles after n is switched to the "normalized" state. This is accomplished simply by inserting the $\overline{M}$-cycle delay element 62 between the n signal register 66 and the mode signal line.

Figure 74:
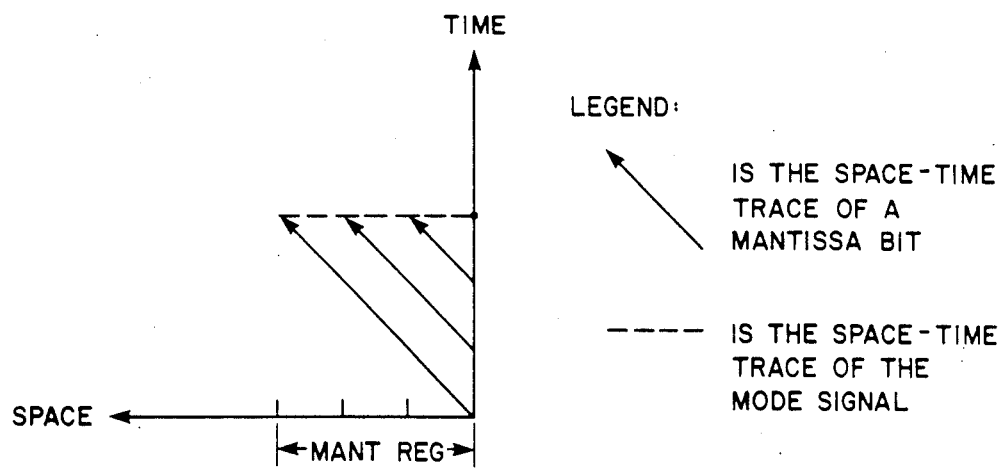
FIG. 74 is a space-time diagram illustrating the broadcast operation of the mant accumulator 60 in FIG. 72.
Figure 75:
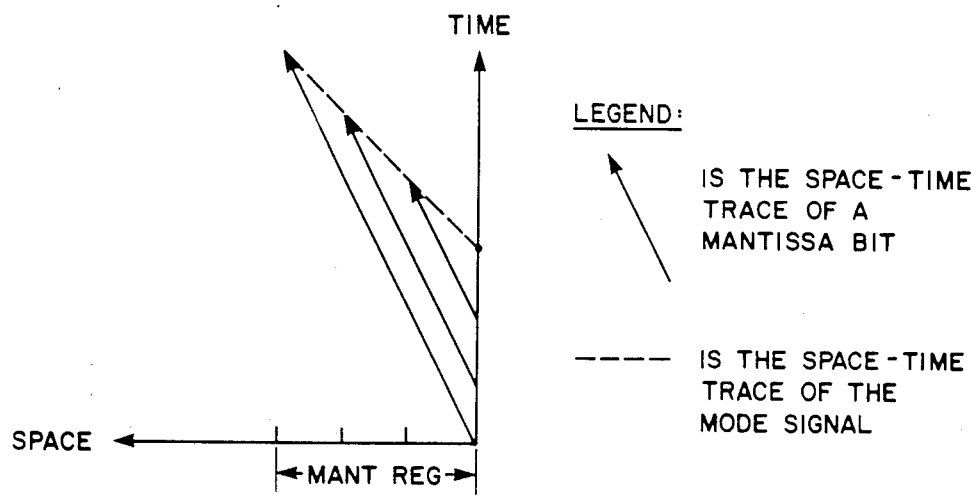
FIG. 75 is a modified space-time diagram illustrating cellular operation of the mant accumulator 60 in FIG. 72.

As presently described, the operation of the mant register 60 requires the broadcast of the mode signal. To understand the transformation of this design to a cellular design, reference is first made to the space-time diagram of the mant register operation shown in FIG. 74. The mode signal broadcast is eliminated by the linear transformation of space-time that is depicted in FIG. 75. As can be seen from FIG. 75, the mode signal is no longer broadcast through the cells of the mant register 60, but rather moves left at the rate of 1 cell/cycle. The arrival schedule of mantissa bits at the low-order end of the mant register 60 is unchanged by the transformation, since it is not desirable to modify the output schedule of the super accumulator. Once in the mant register, however, these mantissa bits move left at the rate of 1 cell/2 cycles. The latency of the cellular design thus is $2\overline{M}$-1 cycles, as compared to $\overline{M}$ cycles for the broadcast approach. This slower rate of mantissa bit motion is implemented by inserting an extra 1-cycle delay element into each cell of the mant register 60.

Figure 76:
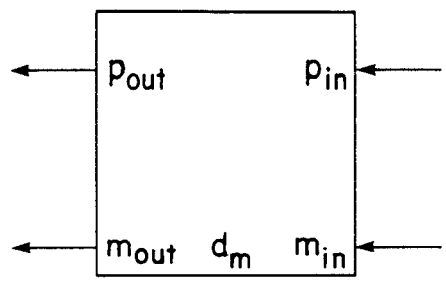
FIG. 76 is a cell diagram of a modified cell of the mant accumulator 60.

FIG. 76 depicts a cell in the mant register 60, including a new Boolean variable $d_m$, the delay bit which is employed to describe bit movement in the mant register 60. The input-output equations for the cells of the register 60 are as follows. Initially, the cells of the mant register 60 are in "shift" mode, with p=1. The mode signal is transmitted at the rate of 1 cell/cycle.

$$p \leftarrow p$$

For the low-order mant register cell, $p \leftarrow n \cdot z^{-\overline{M}}$, i.e., the p signal going into the right end of the mant register 60 is simply a delay version of the n signal.

The mantissa bit is shifted if and only if the cell is in shift mode, and does so in two cycles. That is, when p=1, $d_m \leftarrow m_{in}$ in one cycle, and then $m_{out} \leftarrow d_m$ on the next cycle:

$$d_m \leftarrow (p \cap m) \cup (\bar{p} \cap d_m),$$

$$m \leftarrow (p \cap d_m) \cup (\bar{p} \cap m_{out}).$$

When p=0, $m_{out} \leftarrow m_{out}$, i.e., shifting of mantissa bits is stopped.

Figure 77:
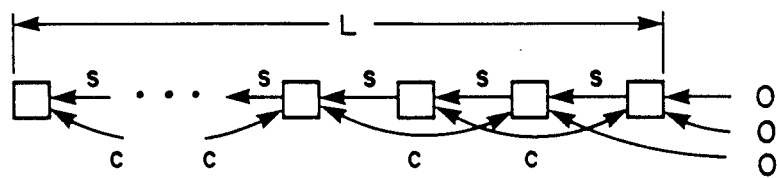
FIG. 77 is an illustration of the left shifting in the super accumulator.

Finally, we note those changes to the super accumulator that are needed to implement the unconditional shift left. FIG. 77 depicts the new $\alpha_1$ super accumulator. Again, this design is not pipelined. The Boolean equations are as before, only now the s-bit moves left at the rate of 1 cell/cycle. Anticipating simultaneous treatment of carry resolution in $\alpha_1$, it should also be noted that the c-bit now moves left at the rate of 2 cells/cycle.

Let us now relax the assumption that carries are resolved before normalization begins, but rather assume that, while the mantissa is being normalized and the characteristic encoded, carries may still be propagating leftward in the super accumulator. In order to resolve carries while normalizing, the mant register must be converted into a mant accumulator. That is, both s-bits and c-bits are shifted into the cells of the mant register which, like the cells of the super accumulator cells, will now continue carry resolution.

Let the most significant super accumulator cell denote the leftmost super accumulator cell that has a nonzero s-bit and/or a nonzero c-bit. The contents of the most significant super accumulator cell will hereafter be referred to as the leading mantissa cell or as $m_{\overline{M}}$. The mantissa cell to its right is referred to as $m_{\overline{M}-1}$, and so on. It is important to note that we are not referring to mant cell$_{\overline{M}}$, . . . but rather to the contents of the super accumulator cell that ultimately will reside in mant cell$_{\overline{M}}$, . . . .

Since now the s- and c-bits of $\alpha_1$ are being shifted left, eventually the most significant super accumulator cell will be $\alpha_{1,L}$. That is, the most significant super accumulator cell will eventually depend on both $\alpha_{1,L}$.s and $\alpha_{1,L}$.c. The latter dependence requires redefinition of the normalization indicator n, which now makes the transition to the normalized state according to:

$$n \leftarrow n \cap (\alpha_{1,L}.s \cup \alpha_{1,L}.c)$$

Consider the resolution of c-bits that are shifted into the mant accumulator with the s-bits. It is possible for corresponding carries to propagate one position to the left of the leading mantissa cell, but no further. This is referred to as mantissa overflow, or simply "overflow". For example, if the leading mantissa cell, when detected in the super accumulator, had both a nonzero s-bit and a nonzero c-bit, then a carry would propagate to its left. Whether or not mantissa overflow will occur is something that can be computed as s- and c-bits are shifted from $\alpha_1$ into the mant accumulator. We now introduce an "overflow" indicator o which has three values: "yes", "no", and "maybe". Initially, o has value "maybe". If, for example, both the $s_{in}$- and $c_{in}$-bits of $m_{\overline{M}}$ are "1", then o would be set to $\mp$yes". If only one of the $s_{in}$- and $c_{in}$-bits are "1", then o retains its "maybe" value. In this "maybe" case, mantissa overflow will occur if, in $m_{\overline{M}-1}$, both the $s_{in}$- and $c_{in}$-bits are "1"; it will not occur if both are "0"; and it may occur if exactly one has value "1". "yes" and "no" are terminal states of the overflow indicator; "maybe" is the transitory state.

After $\overline{M}$ mantissa cells have been shifted into position, i.e., after the mant accumulator has been loaded, o may still be in the "maybe" state. At the cycle at which full loading of the mant accumulator occurs, it can be asserted that a necessary condition for o to be in the "maybe" state is that, for all mantissa cells, exactly one of its $s_{in}$- and $c_{in}$-bits have a "1" value. That is, all cells of the mant accumulator have content "1". In any other case, o has been determined to be either "yes" or "no". There are two events that can still change o to the "yes" state. One is carry propagation still being resolved in $\alpha_1$, while the second is the rounding operation.

Rounding

In the present discussion, the rounding operation is considered to be "rounding to nearest". The directed roundings will be discussed later. Other roundings such as rounding toward or away from zero are straightforward variants of the rounding operations treated here, and need not be discussed in detail.

Rounding is performed by adding "1" to $m_0$, a cell to be appended to the right of the low-order cell $m_1$ in the mant register 60. If this addition generates a carry and if o="maybe", then o←"yes". If no carry is generated, the o retains its value of "maybe".

Figure 78:
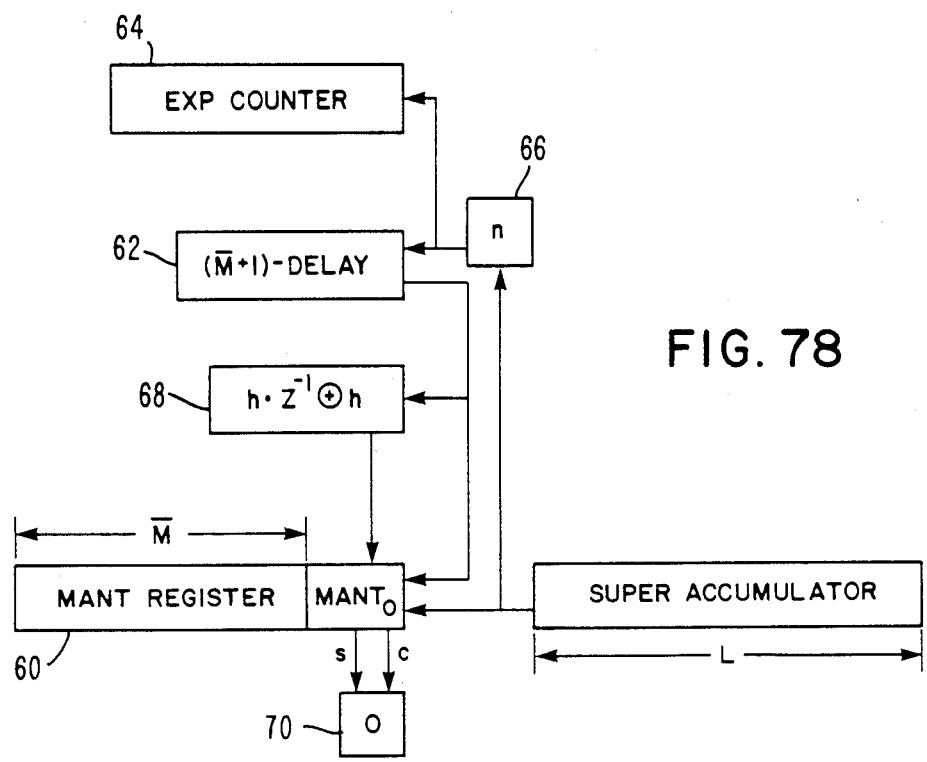
FIG. 78 is an illustration of enhanced architecture for performing normalization, characteristic encoding and rounding.

FIG. 78 gives a schematic of the architectural changes incorporated for rounding. The mant register 60 is extended from $\overline{M}$ cells to $\overline{M}+1$ cells, named $mant_{\overline{M}}$, $mant_{\overline{M}-1}$, . . . , $mant_0$, with $mant_0$ being the "rounding" cell. The $\overline{M}$-delay element 62 is extending to an $\overline{M}+1$-delay element. When the mode signal of value "hold" is generated, $\overline{M}+1$ mantissa cells occupy the mant accumulator 60. At this point, a "1" is added to $mant_0$. The value added to $mant_0$ is referred to as the round signal r, and has a value of "1" once, and only once, per sum. It is generated by comparing successive values of hold in a delay-and-compare circuit 68. Initially, r=0. When the mode signal changes value, a round of "1" is generated, i.e., $$r \leftarrow p \cdot z^{-1} \oplus p$$

This accomplishes rounding, and the o indicator 70 is updated accordingly.

The other event that will move o to a terminal state, if it is not already in a terminal state, is carry propagation from low-order cells. Indeed, once the mantissa accumulator 60 has been loaded, these low-order super accumulator cells are no longer needed except to resolve the overflow question. When the mant accumulator 60 is in "hold" mode, the super accumulator is shifting its remaining contents left and these contents are "falling off" of the left end of the super accumulator. As each super accumulator cell is shifted out of the left end of the super accumulator, it is examined to see if it resolves the overflow question.

If o="maybe"
Then if $\alpha_{1,L}.s = \alpha_{1,L}.c = 1$
  then o←"yes"
  else if $\alpha_{1,L}.s = \alpha_{1,L}.c = 0$
    then o←"no"
    else o retains its "maybe" value and the next super accumulator cell is examined which will be shifted out on the next cycle.

This process is guaranteed to terminate because, as the super accumulator is shifting left, values of "0" are fed into the right cell for both its s- and c-bits. Thus, the overflow question is resolved in no more than L cycles after normalization begins.

In the design so far described, when mantissa overflow occurs, the mantissa and characteristic need to be adjusted. The design should now be enhanced to include these adjustments. The schematic for this enhancement is given in FIG. 79. The goal is to adjust the mantissa and characteristic if no overflow occurs. First, another mant accumulator cell is appended, denoted $mant_{\overline{M}+1}$. The mant accumulator now consists of $\overline{M}+2$ cells, numbered $\overline{M}+1, \overline{M}, \overline{M}-1, \ldots, 0$, with $mant_{\overline{M}+1}$ being used to hold the mantissa overflow, if it occurs. Only $\overline{M}+1$ shifts are made into the mant accumulator 60, filling $mant_{\overline{M}}$, $mant_{\overline{M}-1}$, ..., $mant_0$, with $mant_{\overline{M}+1}$ receiving the overflow from $mant_{\overline{M}}$.

On the other hand, if there is no overflow, then it would be desirable to shift the mant accumulator 60 one more time so that, in either case, the final mantissa resides in mant cells $mant_{\overline{M}+1}$, . . . , $mant_2$. That is, if no overflow occurs, one last mode signal of value "shift" should be generated.

Similarly, we now want the exp counter 64 to have the correct value if overflow occurs, generating one last decrement signal if overflow does not occur. One simple way to achieve this is to start the exp counter 64 at $2^C$ (i.e., all zeros because the exp counter is a mod $2^C$ counter). If there are k leading zeros, the counter will contain $2^C - k$. If overflow occurs, $2^C - k$ is the correct value, i.e., $2^C - 1 - (k-1)$. If overflow does not occur, it is necessary to decrement the counter one last time to obtain $2^C - (k+1) = 2^C - 1 - k$, the correct value.

Thus, what is called for is an adjustment signal a that (1) has value "1" if and only if overflow occurs, (2) has this value on only one cycle, since it is desirable to obtain only a single additional decrement and shift, and (3) has this value on a cycle when neither the shift nor the decrement would be done otherwise.

The first cycle on which this additional shift may take place must be after both an overflow is determined and the mantissa is shifted into place in the mant accumulator 60 (which happens after the last decrement signal was sent to the exp counter 64).

Thus, the adjustment signal a can be $$a \leftarrow (o=\text{``no''}) \cap \bar{p}$$

except that a should be 1 only on one cycle per sum. This is accomplished via the same technique that is used to generate the rounding signal of "1" only once per sum:

$$a \leftarrow ((o=\text{``no''}) \cap \bar{p}) \cdot z^{-1} \oplus ((o=\text{``no''}) \cap \bar{p}).$$

The a signal now assumes a "1" value during at most one cycle per sum, i.e., the first cycle when $((o=\text{``no''}) \cap \bar{p})$ assumes a value of "1". This a signal can be generated in a simple logic circuit 72 in FIG. 79.

Finally, it is necessary to combine the decrement and the mode signals so that they occur either as before or due to the a signal. Notice that the a signal assumes its "1" value, if ever, after both n has changed to the "normalized" state and p has changed to "hold". Thus, the shift and the decrement caused by its "1" value are indeed in addition to the shifts and decrements caused by the n and p signals.

The new signals now are as follows. First, there is a decrement signal d, generated by simple decrement logic 74, that is "1" if either n or a are themselves "1":

$$d \leftarrow n \cup a$$

There is also a left shift signal l, generated by simple shift signal logic 76, that is "1" if either p or a are themselves "1":

$$l \leftarrow p \cup a$$

This apparatus resolves carries, normalizes the mantissa, rounds, and encodes the characteristic. Moreover, it does all of these things concurrently.

Figures 79, 80:
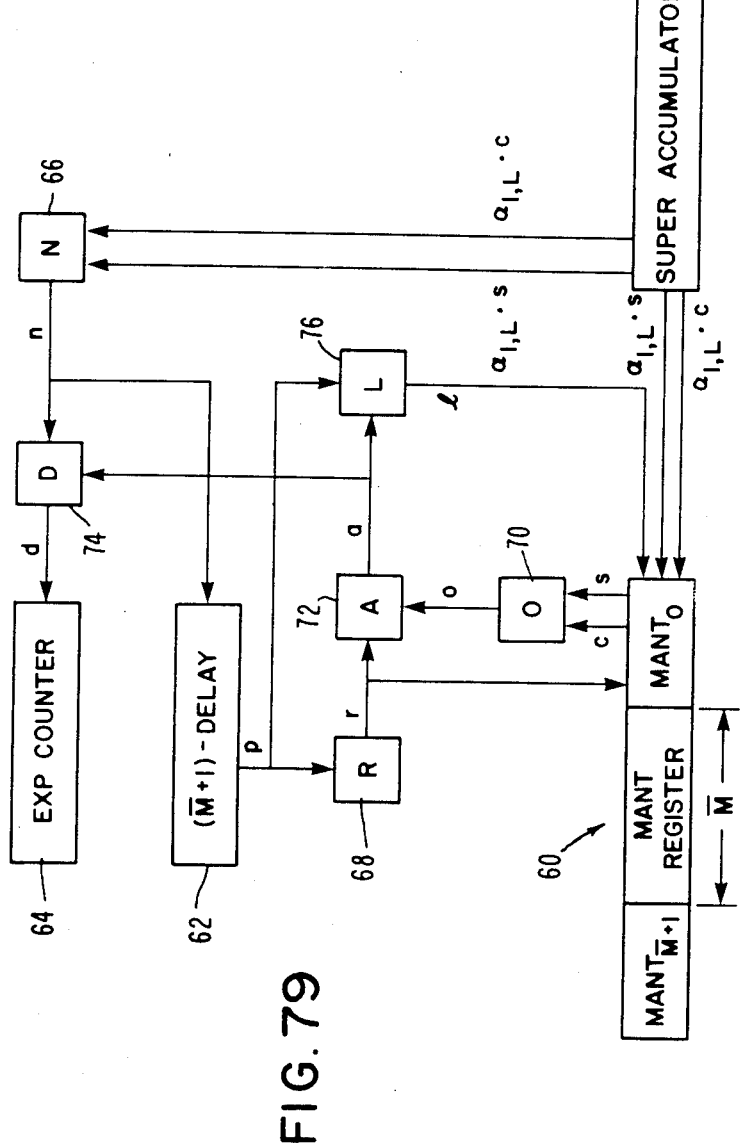
FIG. 79 is a schematic of the hardware for performing normalization, characteristic encoding and rounding, including the final adjustments to the mantissa and characteristic.
FIG. 80 is a schematic illustration of a cellular version of the encoding apparatus of FIG. 79, with "*" denoting communication of $\alpha_{1,P}.s$ and $\alpha_{1,P}.c$.
Figure 81:
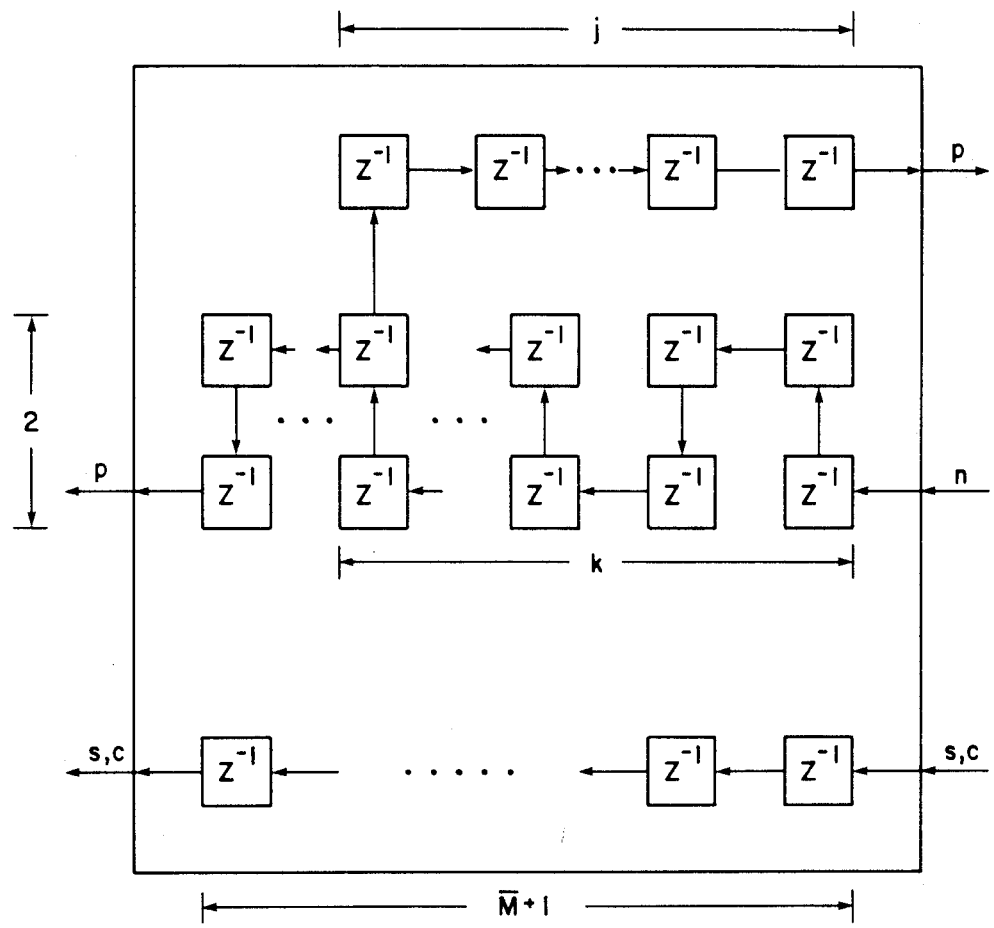
FIG. 81 is a diagram of the DELAY cell 82 in FIG. 80.

The apparatus in FIG. 79 is not obviously cellular, and must now be converted to an architecture that is. The cellular version is depicted in FIG. 80. The s- and c-bits that are shifted out of the super accumulator are transmitted cellularly, along the path indicated by the "*", through the cells of the exp counter 78, a D' cell 80, a DELAY cell 82 and an L' cell 84, to the mant accumulator 60.

For convenience, the low- to high-order cells of the exp counter 78 are arranged from left to right.

The important signals generated in the non-cellular architecture are d and l. These signals are also produced in the cellular architecture. The signal d can be rewritten in terms of constituent signals:

$$d = n \cup a = n \cup (((o=\text{``no''}) \cap \bar{p}) \cdot z^{31} 1 + ((o=\text{``no''}) \cap \bar{p}))$$

In the above expression, n is a bit of state in D' cell 80 whose value is "1" until $\alpha_{1,L}.c \cup \alpha_{1,L}.s$. That is, $n=\text{``1''}$ until the leading mantissa bit is detected. It is communicated to the DELAY cell 82. o is a second bit of state in D' cell 80 whose value is "1" if and only if at least two of $\alpha_{1,L}.s$, $\alpha_{1,L}.c$ are r are "1" during the same cycle. Since the D' cell 80 has access to s- and c-bits, and $r = p + p \cdot z^{-1}$, it can compute the n and o state bits. The D' cell 80 also needs a third bit of state to save the old value of $p \cdot p \cdot z^{-1}$.

The DELAY cell 82 takes the n signal and feeds back a p signal $\overline{M}+1$ cycles later. A schematic of DELAY cell 82 is given in FIG. 80. A p signal is also produced from the left side of the DELAY cell 82. The s- and c-bits emerging from the left of the cell 82 are delayed $\overline{M}+1$ cycles. The p signal is delayed $2\overline{M}+2$ cycles, however. It is therefore indeed a p signal relative to the s- and c-bits.

Finally, the L' cell 84 transmits the s- and c-bits, and produces a desired l signal.

$$l = p \cup a = p \cup (((o=\text{``no''}) \cap \bar{p}) \cdot z^{-1} \oplus ((o=\text{``no''}) \cap \bar{p})).$$

Thus, the L' cell needs a bit of state to hold the old version of $p \cdot p \cdot z^{-1}$. It needs a second bit to record the o state. Like the D' cell 80, it has the s- and c-bits, and so can compute o.

The apparatus as now described can concurrently resolve carries, normalize the mantissa, round, and encode the characteristic. Moreover, it is cellular. The architecture should now be pipelined, and the method for pipelining is identical to that described earlier for designing the A-pipeline. The apparatus of FIG. 80 is replicated, and every time a new sum is started, the encoding process is bumped to the next copy of the apparatus. As before, $\sigma$ is used to signal the transfer. The number of "copies" of the apparatus, i.e., the length of the pipeline, is merely the worst case latency of the encoding process divided by the time for the shortest sum to finish in the initial accumulator $\alpha_0$. This last is $M+1$ cycles. In the worst case, the last part of the encoding computation is the carry into $\text{mant}_{M+1}$, due to a mantissa overflow that is detected at the last possible point, L cycles after normalization begins. This overflow requires an additional $C+1+\overline{M}+1+1+\overline{M}+2 = 2\overline{M}+C+5$ cycles to propagate into $\text{mant}_{\overline{M}+1}$. Thus, $(2^C+M+2\overline{M}+C+5)/M$ copies of the apparatus of FIG. 80 are needed. For anticipated values of C, M, and $\overline{M}$:

$$(2^C+M+2\overline{M}+C+5)/M = 13.$$

The final encoding mechanism, as depicted in FIG. 80, should be viewed as a formal extension of an accumulator. In this regard, it should be recalled that all Boolean variables in the A-pipeline must exist in two varieties, a standard variety and a transfer variety (the latter identified with the superscript $\tau$), with the transfer variety being used in reaction to the $\sigma$ signal to conduct the movement of the state variables from $\alpha_i$ to $\alpha_{i+1}$. Notice that the super accumulators can be shortened by M+1 cells at each stage, since at least that many left shifts take place per stage.

Departure

The description now proceeds to the process of removal of a completed sum from the apparatus. At any cycle, the A-pipeline of accumulators $\alpha_0, \ldots, \alpha_P$ contains sums in various stages of completion. Completed sums may be interspersed with sums still being resolved. In the description thus far, only the arrival of an end-of-sum signal $\sigma$ causes a sum to move in a single step to the next accumulator in the A-pipeline. In principle, it requires the arrival of P successive $\sigma$ signals to drive a sum, completed or not, from $\alpha_0$ all the way to $\alpha_P$. Moreover, because of the worst case choice of P, the arrival of a $(P+1)^{st}$ $\sigma$ signal cannot occur before the sum occupying $a_P$ is complete. Thus, the A-pipeline is augmented with an additional register $a_{P+1}$ of length $M+C$ whose contents can only be complete sums.

The design of the A-pipeline will now be modified so that a sum may depart from the apparatus, by a procedure which is initiated as soon as that sum is completed. Moreover, given the restrictions imposed by the design itself, this departure mechanism allows for departure of a sum as soon as it is complete, essentially unrestrained by the activity of other sums in the pipeline. This mechanism disturbs the order of successive sums which have entered into the apparatus, thereby requiring that a tag mechanism be used for sum identification, as will be described below.

First, the final encoding process is augmented with an exit signal x. The purpose of the signal x is to indicate that the summation process is complete, and that the resulting mantissa and characteristic bits can begin to exit from the A-pipeline. This x signal is quite similar to the adjustment signal a. After the rounding signal has been generated and the overflow question has been resolved, the encoding processing is complete "modulo" the final adjustment, if any, to the mant accumulator and exp counter. This condition can be expressed as follows:

$$o = \text{"maybe"} \cap \bar{p}.$$

This signal expression is converted to an impulse signal expression (i.e., high-valued on only one cycle) with the now familiar technique:

$$x_p \leftarrow (o = \text{"maybe"} \cap \bar{p}) \cdot z^{-1} \oplus (o = \text{"maybe"} \cap \bar{p}).$$

Figure 82:
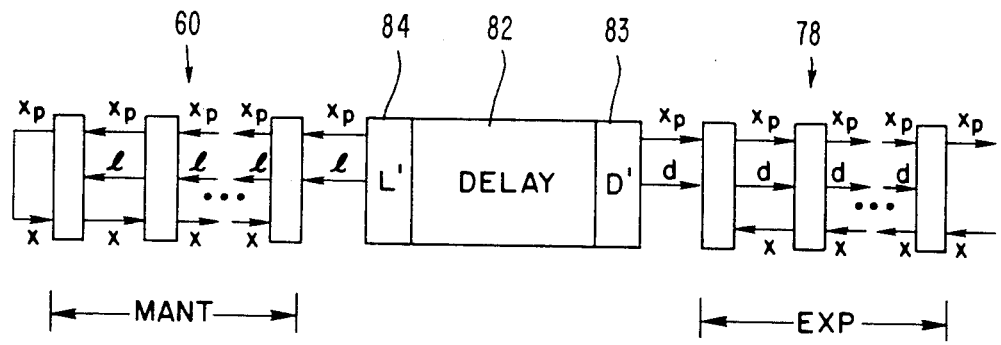
FIG. 82 is a schematic of the architecture for performing final encoding, illustrating the movement of the proto-exit signal $x_p$ and the exit signal $\underline{x}$.

This proto-exit signal $x_p$ becomes a valid exit signal x only after the final adjustment, if any, is complete. To ensure this, $x_p$ travels alongside the left shift signal and decrement signal d, the signals based on a that induce the final adjustment. When l and d (and $x_p$) have propagated through the mant accumulator and exp counter, respectively, then the encoding process is truly complete. At this point the $x_p$ signal is reflected back into the mant accumulator and exp counter and is the exit signal x. FIG. 82 illustrates the $x_p$ and x signal movement through the augmented final encoding apparatus.

The x signal moves cellularly from left to right across the mant accumulator 60, and from right to left across the exp counter 78. This x signal causes the sum to descend through the A-pipeline. First, the basic exit movement will be described, followed by a description of the proper interaction with predecessor sums, and finally the interaction of the exit signal x with the transfer signal $\sigma$.

Figure 83:
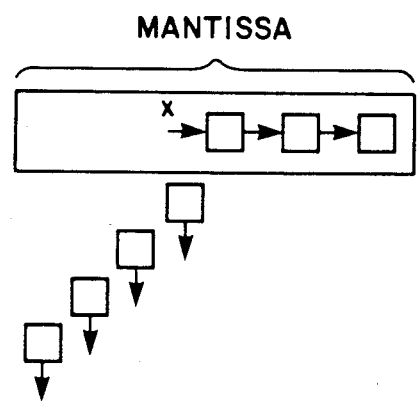
FIGS. 83 and 84 are illustrations of the skewing effect of the exit signal $\underline{x}$ on the contents of the mant accumulator 60 and exp counter 78.
Figure 84:
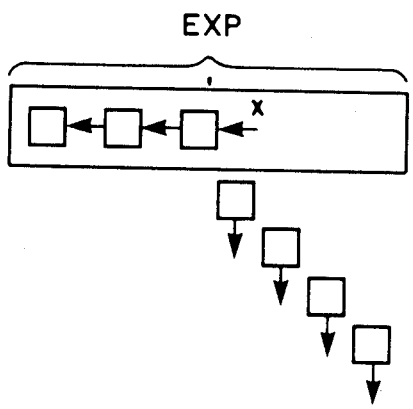

The exit signal moves horizontally over time, communicating to the mantissa bits that they are in final form. Upon receiving the exit signal, a cell transmits:

1. the exit signal to its horizontal low-order neighbor (i.e., rightward in the mant accumulator 60 and leftward in the exp counter 78); and
2. its mantissa (or characteristic) bit to its neighbor below. The net effect of these motions is to skew the mantissa and characteristic as shown in FIGS. 83 and 84, respectively.

It may be that one sum is completed before its predecessor. In order to avoid over-writing a sum that is in progress with one that is completed and exiting, the mantissa and exponent bits must each exist in two varieties: a standard variety (m and e), and a transfer variety ($m^\tau$ and $e^\tau$). The mechanism for movement of a completed mantissa through the remainder of the A-pipeline is as follows.

If a completed mantissa bit $m^\tau$ enters a cell that is not simultaneously receiving an exit signal
    then the completed mantissa bit descends through this level of the A-pipeline
    else the completed mantissa bit pauses its downward motion for one cycle, letting the predecessor mantissa bit, which is also completed, descend first.

The Boolean input-output equations describing these exit motions follow:

If the exit signal has value "0"
    then the m bit is unaffected
    else the current m bit is exiting and this bit of memory is used to store the incoming $m^\tau$.

$$m \leftarrow (\bar{x} \cap m) \cup (x \cap m^\tau).$$

If the exit signal has value "1"
    then the current m bit begins to exit by being placed in $m^\tau$
    else
        if on the previous cycle, the exit signal had value "1",
        then the current value of m is holding a paused value of $m^\tau$ which must now resume its exit motion;
        else simply transmit the value of $m^\tau$ through this mantissa cell.

In the last case, the order in which summations leave the apparatus differs from the order in which their respective summands entered the apparatus.

$$m^\tau \leftarrow (x \cap m) \cup (\bar{x} \cap x \cdot z^{-1} \cap m) \cup (\bar{x} \cap \overline{x \cdot z^{-1}} \cap m^\tau)$$

Here, as customary, $z^{-1}$ denotes a one cycle delay. The corresponding equations for the exiting of the exponent bits are completely analogous to the these equations. It is to be emphasized that this exiting motion is appended to all other bit processing in the A-pipeline which is otherwise left as previously described.

Finally, we observe those behavioral changes of cells that are needed to coordinate the accumulator transfer, signaled by $\sigma$, with the exit movement initiated by $\underline{x}$. When an accumulator cell $a_{ij}$ receives a transfer signal $\sigma$, its contents should be transferred down one level, regardless of what activity is taking place. The exit mechanism is in no way interrupted by the action of $\sigma$. The approach is quite like that of carry propagation in the presence of accumulator transfer, and proceeds independently. As with all state variables in the A-pipeline, x must exist in a transfer variety $x^\tau$ to accommodate the motion induced by the arrival of a $\sigma$ signal.

Upon entry of a $\sigma$ signal into the apparatus, a tag enters the tag channel 12 (FIG. 1) and descends through it in step with that $\sigma$ signal. This tag is referred to as the T-tag, and moves asynchronously as governed by arrivals of $\sigma$ signals. The T-tag is an integer T which counts sums $\mod(P+2)$. Every sum within the apparatus thus has a unique T-tag.

When an exit signal is first generated and the resulting sum begins emerging from the apparatus, the T-tag is available alongside. In this manner, the output is identified for transmission.

Figure 59:
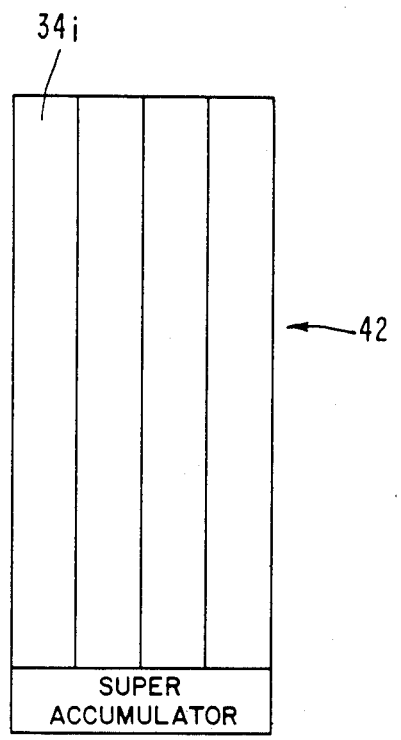
FIGS. 59 and 60 are front and top views, respectively, of a cylindrical sieve having $(2^C+M)/M=8$ sinking regions.
Figure 60:
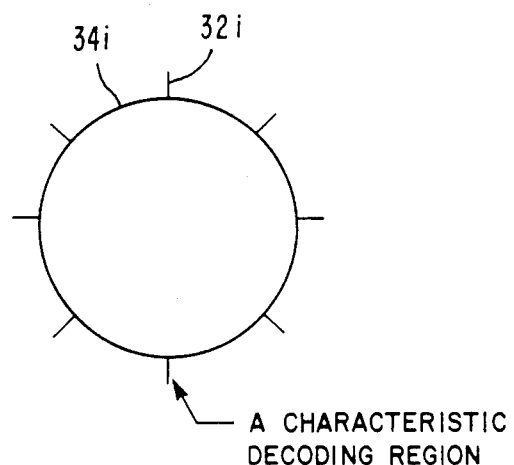
Figure 68:
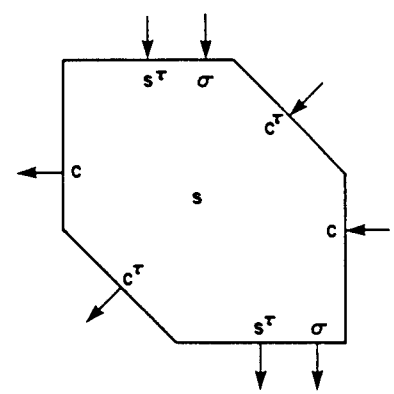
FIG. 68 is a cell diagram for an accumulation cell, with the $s^\tau_{in}$ being $s^a$ for accumulator $a_1$.
Figure 69:
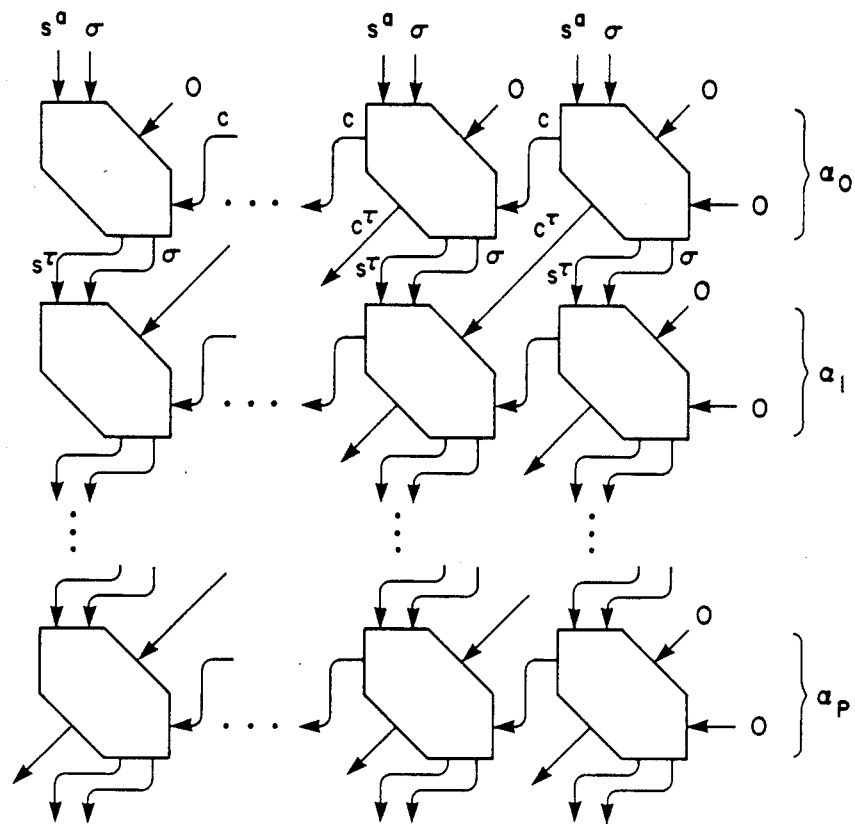
FIG. 69 is an explanatory diagram of the carry resolution pipeline.

This completes the description of the basic apparatus of this invention, a cellular hardware device for the fast computation of repeated floating-point sums with an accuracy of only a single rounding operation. The preferred embodiment of the summer would include a sieve having a characteristic decoding region with cells as shown in FIG. 16. The sieve and accumulator pipeline would be arranged in a cylindrical configuration, with the sieve having a plurality of sinking regions as shown in FIGS. 58 and 59. The cells in the leftmost sinking region would be as shown in FIG. 66, with the remaining cells being as shown in FIG. 67. In the upper triangle of the sieve region where propagation of the end-of-sum signal is unnecessary, the input and output terminals for propagating that signal would merely be unused. The bottom row of cells in both the sieve and sinking region would be enhanced, as shown in FIG. 62, to include an additional $c^a$ output to avoid the second-order carry in the accumulator. The accumulator pipeline would be composed of individual cells as shown in FIG. 68 configured in a matrix as shown in FIG. 69. Adjacent each accumulator $a_i$, there would be encoding and rounding circuitry as shown in FIG. 80 which would essentially be an extension of the accumulator having a cellular construction. Upon each transfer of the contents of accumulator $a_i$ to $a_{i+1}$, the corresponding contents being processed in the mant accumulator, delay 82, etc., would similarly be transferred to the next level mant accumulator, delay, etc.. Indeed, as described above, the encoding and rounding circuitry is to be considered merely an extension of, and part of, the accumulator pipeline. The individual cells could be configured in any number of ways straightforward to one of ordinary skill in the art. Rather than illustrate various examples of the internal details of these cells, the cells have been thoroughly mathematically defined and their functions explained, so that it would be a simple matter to implement suitable logic circuitry for performing the required functions.

The invention as disclosed above is effective in high speed computation of floating point sums. At the cell level, the design uses a synchronous model of VLSI. The amount of time required by the apparatus of this invention to compute an entire sum depends on the values of the summands, since the operation becomes asynchronous in the A-pipeline. The throughput per unit area of the hardware approaches that of a tree network, but without the long wire and signal propagation that are intrinsic to tree networks. The advantages of the invention are made possible largely by the arrangement of the sieve which, in turn, is possible only due to the realization of the inventors of a technique for allowing large numbers of mantissas descending vertically and diagonally to collide with one another without degradation, all without exceedingly complex cell configurations. This is accomplished by providing a signal combining function in the sieve which prevents unlimited increase in the number of bits which would otherwise have to occupy a single cell.

There are of course a number of refinements and extensions of the basic design, a few of which will now be described, e.g., the summation of signed summands, the treatment of directed roundings needed for interval arithmetic, and the introduction of a holding mode of accumulation needed for the computational technique of iterative residual correction.

Signed Summation

First will be described some architectural changes that permit the summation of signed numbers. It is assumed that the format of an input is $$c_1c_2\ldots c_Csm_1m_2\ldots m_M,$$

where $s=1$ if and only if the number is negative. The scheme described is based on the notion of signed bits. A signed bit has one of three values: Positive (+), Negative (−), and Zero (i.e., Neutral) (0). Since it can assume three values, two bits are used to represent a signed bit. The approach discussed here entails:
1. Converting unsigned mantissa bits into signed mantissa bits;
2. Processing these bits through the sieve;
3. Accumulating signed bits in the super accumulator; and
4. Post-processing of the signed accumulation: sign detection, normalizing, characteristic encoding, rounding, and resolving carries.

Each unsigned mantissa bit m is converted to a signed mantissa bit as the mantissa bit is being skewed in the bit skewer 14. On entry into the skewer, e.g., a skewer of the type shown in FIG. 6, the mantissa bits are encoded as follows:
   A mantissa bit of "0" is encoded as "0".
   A mantissa bit of "1" is encoded as "+".

The sign bit s propagates down and to the right through the cells that skew mantissa bits. If a sign bit of "1", indicating a negative summand, propagates into a skew cell that contains a "+" mantissa bit, then the "+" mantissa bit is converted to a "−" mantissa bit. In all other cases, the signed mantissa bit remains unchanged. After skewing is complete, the nonzero mantissa bits of a summand will all be "+" or "−" depending on the value of the sign bit s.

Sieving of the signed mantissa bits is done as before. The only difference is that now the mantissa bits which are being shifted are signed bits. This difference affects the nature of coalescence. If the two coalescing bits are not of opposite sign, then coalescence logic is as before, and the sign carries over to the coalesced bits. If, on the other hand, the two coalescing bits are of opposite sign, then they cancel, and the emitted $m^\tau$ and c-bit values are both "0". It should be clear that coalescence of signed mantissa bits neither complicates nor invalidates the structure of the sieve process. The time of arrival of mantissa bits at the accumulator, including those resulting from coalescence, will still be unaffected by decoding and collisions, and there will still be at most two mantissa bits, including those produced by coalescence, that simultaneously enter a sieve cell.

Since mantissa bits are signed, the super accumulator logic must change. One way to do this is to sign all three inputs of the super accumulator cell. Accumulation logic is oriented towards the goal of post-processing: sign detection, normalization, etc. To this end, the following simple fact is exploited:

$$-x = -2x + x.$$

That is, when a "−" bit would be placed in an accumulator cell, we replace it with a "+" bit, sending a "−" carry bit to the left. In this way a "−" bit propagates left until it is canceled by an equal weight "+" bit. If the sum is negative, then some "−" will propagate left, uncanceled by any "+" bit. This fact is used in the subsequent process of sign detection.

Accumulator logic can thus be summarized as follows. The "+" and "−" bits are counted among the three signed inputs of the accumulator cell. This count will be in the range of [−3, +3]. The signed values of the sum bit s and the carry bit c are assigned according to the table below

| COUNT | C | S |
|---|---|---|
| +3 | + | + |
| +2 | + | 0 |
| +1 | 0 | + |
| 0 | 0 | 0 |
| −1 | − | + |
| −2 | − | 0 |
| −3 | − | − |

Again, the c-bit value that results from a count of −1 has the effect of keeping the "−" bit "moving" left until it is either canceled or becomes the leading nonzero bit. If a sum is negative, then it will ultimately have a "−" leading bit which will propagate off of the left end of the super accumulator, leaving a trail of "+" bits to its right. The net effect of this logic is that all "−" bits are ultimately converted to "+" bits. The resulting super accumulator, comprised of only "0" and "+" bits, is a two's complement encoding of the sum. The change in logic of the bottom row of sieve cells is handled similarly as before.

As before, it is necessary to find the normalized mantissa, encode the characteristic, and round, while resolving carries. The sign of the sum must also be detected. Once the sum has been transferred to $a_1$, it is being shifted left one position per cycle. Sign detection, like other computations, is performed by a serial examination of $a_1$, from its high-order cells to its low-order cells. In $a_1$, there are signed s- and c-bits only; no new bits are being accumulated. A cell, therefore, can be characterized by the sum of the values of its entering s- and c-bit values. This sum is in the range of [−2, +2]. Sign detection can be described as a finite automaton over the alphabet $$\Sigma = \{-2, -1, 0, +1, +2\}.$$

Figure 85:
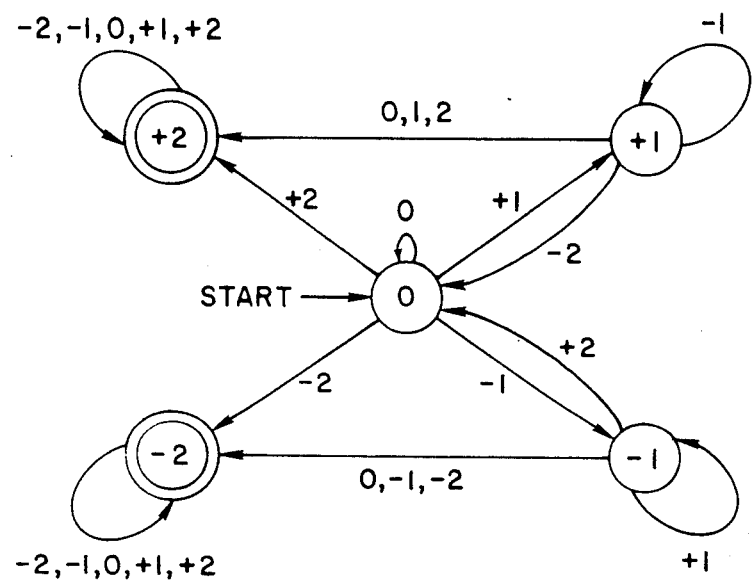
FIG. 85 is a diagram of a sign detection finite automaton.

FIG. 85 shows the automaton, which reads super accumulator cells from left to right and has a set of states:

$$Q = \{-2, -1, 0, +1, +2\}.$$

These states may be described as follows:
+2: The sum is positive.
−2: The sum is negative.
+1: The sum is tentatively considered positive.
−1: The sum is tentatively considered negative.
0: No information is known about the sign of the sum.
This is the automaton's initial state, $q_0$.

Notice that +2 and −2 are states that, when entered, are unchanged by subsequent input, i.e., they are terminal states. Sign detection is complete, therefore, as soon as either of these states is entered. If, after examining the entire super accumulator, the automaton is not in a terminal state (i.e., q ∈ {−1, 0, +1}), then a final state, $q_f$, is assigned a terminal value as follows:

If q = +1 then $q_f \leftarrow +2$;

If q = −1 then $q_f \leftarrow -2$;

Otherwise $q_f \leftarrow +2$ and the sum is exactly zero. In this case, the exponent to be output is C=e1. This matter of detecting the end-of-accumulator can be accomplished by having an end-of-accumulator flag which is fed into $a_{1,0}$ when $a_0$ is transferred to $a_1$ and which shifts left with the other cell information.

A sum with value zero will achieve this worst case in sign detection.

The remainder of the tasks for signed summation can be accomplished by suitably modifying the existing logic in a manner which will be straightforward, and these further details need not be described here.

Directed Roundings

The rounding to be executed as part of a floating-point operation should be specified by that operation. Of course, a basic machine rounding, such as rounding to nearest, may be specified by default. Good computer arithmetic includes the interval operations, and to implement these, it is sufficient to supply the two directed roundings: ∇ (round down) and Δ (round up). For any real number x (lying in the interval between the largest and smallest floating-point numbers), $$\nabla x = \text{greatest number in } R(2,\overline{M},e1,e2) \leq x.$$

$$\Delta x = \text{least number in } R(2,\overline{M},e1,e2) \geq x.$$

It follows that $$\nabla x = -\Delta(-x) \quad (1)$$

The entry of the end of sum signal σ into the apparatus should coincide with the entry of the specification of the rounding operator to be executed. Normally, this may be expected to be either the basic machine round, □, or both of the directed roundings ∇ and Δ. The propagation of this choice of rounding from entry in the apparatus to the A-pipeline where rounding is to be executed may be accomplished in a straightforward manner which need not be discussed in detail here, and the description will be directed to implementation of ∇ and Δ in the A-pipeline. Since rounding to nearest has been described above in detail, directed rounding can be explained by simply noting the changes which are required in the rounding to nearest arrangement.

Figure 86:
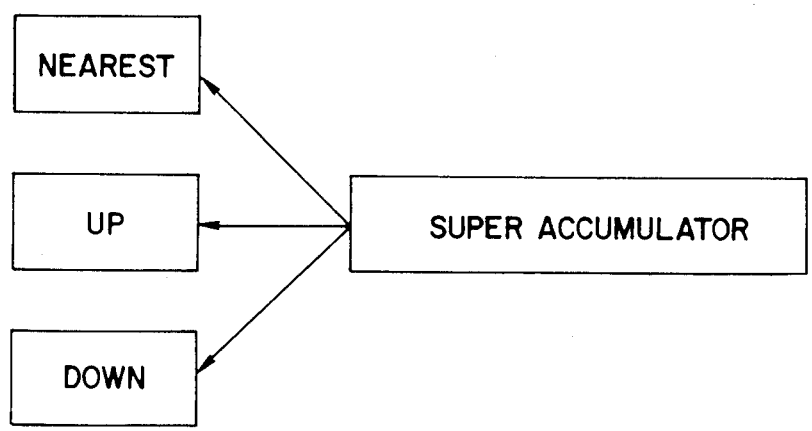
FIG. 86 is an illustration of the super accumulator $\alpha_{i>0}$ left-shifting into three different post-processing apparatus, one for each kind of rounding.

The systolic super summer can be expanded to perform all three kinds of rounding. In general, each of the three kinds of rounding proceed via different mechanisms. For architectural simplicity, therefore, all three rounding processes have their own apparatus, each of which feed off of the super accumulator as indicated in FIG. 86. The techniques that have already been discussed for pipelining the computation and for effecting early departure can be transferred to this multiple rounding environment in a way that is conceptually straightforward. Consequently, the present discussion will focus on the rounding process itself.

The relationship (1) above allows us to confine our attention to positive numbers. Since Δx=greatest number in $R(2,\overline{M},e1,e2) \leq x$, the normalized mantissa is rounded down by simple truncation. No new process is needed. With regard to rounding up, when normalization has just been completed, the normalized mantissa resides in the mant accumulator 60 (mant$_0$ is the "round" cell), and the super accumulator holds the low-order part of the sum.

Rounding up is effected by:
A. Adding +1 to the round cell, if the sign of the low-order part of the sum is positive;
B. Adding 0 (i.e., truncating), otherwise.

Thus, the finite automaton shown in FIG. 85 can be used to compute the value of the rounding signal. It is adapted to emit a value of "+1" if and only if its final state is "+2" (i.e., if and only if the low-order part of the sum is positive).

Holding Mode of Accumulation

Techniques of iterative residual correction require the accurate accumulation of a cluster of sums, e.g., Q in number.

$$S_j = S_{j-1} + R_j,$$

$$R_j = \sum_{i=1}^{N_i} s_i(j), j = 1, \ldots Q.$$

Here $S_0 \equiv 0$. $s_i(j) \in R(2,\overline{M},2e1,2e2)$, $i=1, \ldots, N_j$, $j-1, \ldots, Q$ denotes the $i^{th}$ summand of the $j^{th}$ sum $R_j$ being accumulated. $N_j$ is the number of summands in the $j^{th}$ sum $R_j$. This process is called a holding accumulation. The quantity to be delivered by the apparatus is $$OS_Q \epsilon R(2,\overline{M},e1,e2), O\epsilon\{\Box,\Delta,\nabla\}.$$

A second type of end-of-sum signal is now introduced called $\sigma_H$ for a holding accumulation. $\sigma_H$ propagates through the skewers and the sieve as the $\sigma$ signal does. $\sigma_H$ is used in place of $\sigma$ to signal the end of each constituent sum $R_j$, $j=1,\ldots,Q$. Each $R_j$ is accumulated in $\alpha_0$ in the customary manner. However, $\sigma_H$ bumps $R_j$ not into $\alpha_1$ but into a holding accumulator or bin $\beta_0$ where $R_j$ is added to $S_{j-1}$. $\beta_0$ is initialized with $S_0$ (i.e., with zero).

Carry resolution continues in $\beta_0$ so that the arrival of an $R_j$ creates four inputs for each cell of $\beta_0$. This situation is analogous to the initial accumulation discussed above, and in order to avoid second order carry-bit output in the cells of $\beta_0$, the same solution mechanism is adopted, i.e., $\beta_0$ is augmented with a precursor accumulator $p\beta_0$ that is identical to the special bottom row of cells of the sieve itself. Hereinafter, reference to a bin may mean $\beta_0$, $p\beta_0$, or both, and will be clear from the context. The end of $R_Q$, the last sum in a cluster, is signaled by both $\sigma$ and $\sigma_H$. The arrival of $\sigma$ and $\sigma_H$ at $\alpha_0$ causes $R_Q$ to be bumped into $p\beta_0$ as usual, but two cycles later following the movement of $R_Q$ from $p\beta_0$ into $\beta_0$, the contents of $\beta_0$ are bumped into $\alpha_1$. This last bumping is a process completely analogous to the bumping by a $\sigma$ signal of the contents of $\alpha_0$ to $\alpha_1$. The only change is that $\beta_0$ replaces $\alpha_0$. It is in principle possible that another $\sigma$ signal, arriving at $\alpha_0$ at the same cycle as the one in question arrives at $\beta_0$, will cause a conflict at $\alpha_1$. This may be ruled out of $M>2$, which is henceforth assumed.

Recall from the discussion above that a T-tag is given to a summand block as triggered by the $\sigma$ signal. The $\sigma$ signal is on only once for an entire holding accumulation, i.e., following the arrival of the very last summand $S_{NQ}(Q)$. Thus, each holding accumulation receives one and only one T-tag which serves to identify the output of that holding accumulation.

Figure 87:
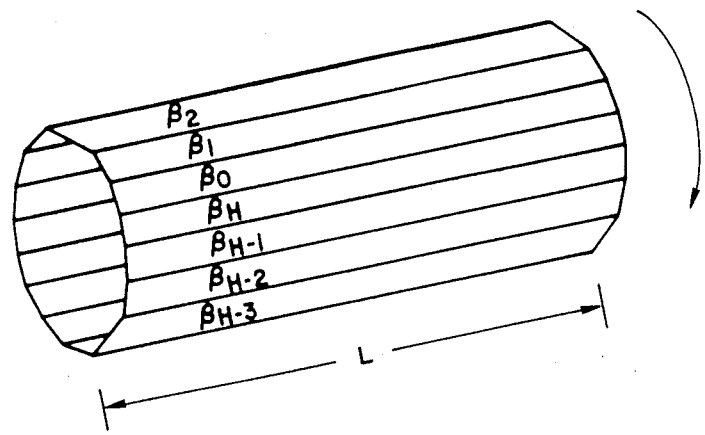
FIG. 87 is an illustration of a B-cylinder showing the facets which accommodate holding bins $\beta_j$, j=0, ..., H−1.
Figure 88:
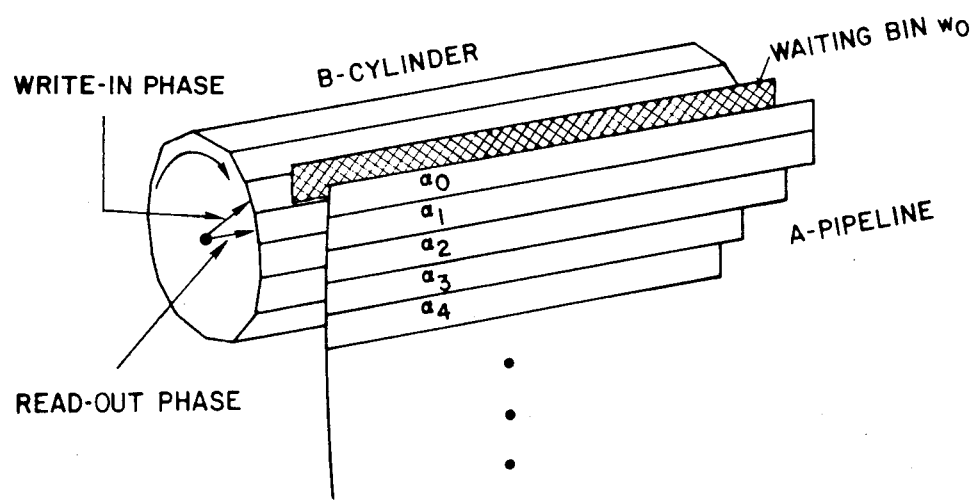
FIG. 88 is a diagram for illustrating the interaction between the A-pipeline and B-cylinder via the weighting bin $w_0$, and also illustrating the write-in and read-out phases.

Suppose that the apparatus may be called on to handle a number of different holding accumulations at once. To accommodate these different accumulations, H different holding bins, $\beta_j$, $j=0,1,\ldots,H-1$, are provided. The apparatus saturates if more than H holding bins are required at any instant. The H holding bins may be pictured as being implemented in the surface of a faceted cylinder, a "B-cylinder" composed of $L \times H$ cells. The B-cylinder is L cells long and H cells around, as shown in FIG. 87. The bins correspond to the facets of the cylinder, and the bins and their contents circulate synchronously around the cylinder, moving one cell every two cycles. To preserve the cellular structure of the apparatus, movement of data from $\alpha_0$ to a bin is allowed to take place only when that bin is rotated into a preselected phase. Correspondingly, data may be removed from a bin for delivery to $\alpha_1$ only from a preselected phase, most likely one face away from the read-in phase in the direction of circulation of the bins on the cylinder, as shown in FIG. 88.

A bin may be needed for accepting the contents of $\alpha_0$ no more than once per M+1 cycles. A waiting bin $w_0$ is then provided to hold the contents of $\alpha_0$ which are destined for a holding bin on the cylinder. The condition $$H \leq (M+1)/2$$

guarantees that the cylinder will accept the contents of $w_0$ before any possible additional use for $w_0$ is manifested. Larger values of H may be accommodated by appending additional waiting bins $w_1, w_2, \ldots,$ in a straightforward manner.

A holding accumulation is an asynchronous occurrence, and it requires a tagging mechanism. Each cluster of sums is given a bin tag B, or "B-tag", which identifies the cluster through its unique location on the B-cylinder. B is an integer mod H, and it identifies the bins on the B-cylinder cyclically. The signal $\sigma_H$ activates the B-tag issuance mechanism. The arrival of $S_{N1}(1)$, the last summand in the first block of a holding accumulation, is followed by the arrival of a $\sigma_H$ signal and, by convention, a B-tag indicator BTI=0. Subsequent arrivals of a $\sigma_H$ signal corresponding to a particular holding accumulation have a BTI value of unity. BTI=0 triggers the issuance of B-tag by the apparatus. Initially B-tag=0, and issuance of B-tag causes $$B\text{-tag} \leftarrow (B\text{-tag}+1) \bmod H.$$

The processor submitting a holding accumulation must remember the corresponding B-tag so that subsequent accumulation is made in the correct bin. With the arrival of the next relevant cluster from that process and its concluding $\sigma_H$ signal, the processor supplies the assigned B-tag as well. The value BTI=1 signals the presence of an assigned B-tag.

The B-tag is propagated through the skewer and the sieve in the manner of a $\sigma$-signal. Of course, this will require $\log_2 H$ bits per cell. The arrive of $\sigma_H$ and the B-tag at $\alpha_0$ causes the bumping of the contents of $\alpha_0$ to the bin $\beta_{B\text{-}tag}$ for accumulation.

The B-cylinder mechanism has a delaying affect on the propagation of the T-tag through the apparatus. In particular, the T-tag must wait between 3 and 3+H cycles in passing from alongside $\alpha_0$ to alongside $\alpha_1$, since the contents of $\alpha_0$ require this many cycles in moving to $\alpha_1$ by way of the B-cylinder.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A device for calculating sums of floating point summands, each summand including a characteristic and a mantissa, said device comprising:

a sieve comprising a characteristic decode section for determining the value of the characteristic of each summand and a sieve section responsive to the determined characteristic of a summand for routing that summand toward an appropriate position at the output of said sieve corresponding to a fixed-point representation of said summand, said sieve including coalescence means for combining mantissas of different summands prior to said sieve output; and accumulator means receiving and accumulating outputs from said sieve and converting the accumulated sum to floating point form, to thereby obtain a floating-point representation of each sum.

2. A device as defined in claim 1, wherein said sieve section passes a first mantissa toward its appropriate sieve output position along first and second path segments and passes a second mantissa toward its appropriate sieve output position along a third path segment and said second path segment, and wherein said coalescence means combines said first and second mantissas in said second path segment.

3. A device as defined in claim 2, wherein each sieve cell includes first and second inputs for receiving first and second mantissa bits and first and second outputs, said sieve cell including means for passing said first and second mantissa bits to said first and second outputs, respectively, when said first and second mantissa bits are en route toward different sieve output positions, with said coalescence means combining said first and second mantissa bits when they are en route toward the same sieve output position.

4. A device as defined in claim 3, wherein said coalescence means includes means for generating sum and carry bits corresponding to the combination of said first and second mantissa bits, said sum bit being provided to said second output, and said sieve cell includes a carry bit for providing said carry bit to an adjacent cell in said sieve.

5. A device as defined in claim 1, wherein each mantissa includes a plurality of mantissa bits passing toward respective sieve output positions along respective paths. and wherein said coalescence means combines only those mantissa bits which are destined for the same sieve output position.

6. A device as defined in claim 1, wherein said summands are received by said sieve in serial-parallel order with said characteristic decoding section comprising a plurality of levels, each level including a plurality of individual bit comparators for comparing respective bits of a characteristic to reference bit values corresponding to an order of magnitude associated with said each level, said sieve section including a plurality of rows of sieve cells and each level of said characteristic decoding section corresponding to a respective row of sieve cells in said sieve section and providing a control signal to cause the sieve cells in said respective row to change the movement direction of the mantissa bits corresponding to the characteristic decoded at said each level.

7. A device as defined in claim 1, wherein each summand includes characteristic and mantissa bits and wherein said sieve section comprises a plurality of sieve cells through which said mantissa bits pass en route toward their respective appropriate positions at the output of said sieve. said coalescence means comprising means for combining mantissa bits which simultaneously occupy a sieve cell en route toward the same position at said sieve output.

8. A device as defined in claim 7, wherein said coalescence means includes means for generating sum and carry bits corresponding to the sum of the combined mantissa bits being routed toward said same position, said sieve passing said sum bits to said same position while passing said carry bits toward a higher order position at said sieve output.

9. A device as defined in claim 8, wherein said coalescence means further comprises means for combining sum, carry or mantissa bits which occupy the same sieve cell en route toward the same sieve output position.

10. A device as defined in claim 7, wherein each said summand further includes a sign bit indicating the sign of said summand, said device including means for converting said mantissa bits to signed mantissa bits and for providing said signed mantissa bits to said sieve, and wherein said accumulator means includes a plurality of bit positions from a most significant bit position to a least significant bit position, and sign detection means for determining the sign of the sum in said accumulator means by successively examining the signs of individual bit positions commencing with said most significant bit position.

11. A device as defined in claim 10, wherein said sign detection means comprises a finite automaton having a plurality of states including at least one terminal state, said sign detection means completing detection of the sign of said sum in said accumulator means upon reaching said at least one terminal state regardless of the number of individual bit positions examined.

12. A device as defined in claim 1, wherein said sieve section comprises a matrix of sieve cells arranged in rows and columns including a sinking section and a ramp section and passes each mantissa vertically through a column in said sinking section until the corresponding characteristic is decoded, said ramp section thereafter passing said mantissa diagonally through at least a portion of said ramp section toward said appropriate position at the output of said sieve.

13. A device as defined in claim 12, wherein each sieve cell in said sinking section includes first ($m^s$) and second ($m^r$) inputs and first ($m^s$) and second ($m^r$) outputs, and a control input (f) for receiving a control signal having a value indicating whether or not the characteristic corresponding to the mantissa bit at said first input has been decoded, said sieve cell passing its second input to its second output regardless of the value of said control signal and passing its first input to its first or second outputs in accordance with the value of said control signal.

14. A device as claimed in claim 13, wherein said sieve section includes a plurality of sinking sections, each of said sinking sections having a corresponding characteristic decoding section decoding said characteristics in a different sequence.

15. A device as defined in claim 14, wherein said accumulator and sieve are arranged in a cylindrical configuration, with said plurality of sinking sections offset with respect to one another around the periphery of the cylinder.

16. A device as defined in claim 1, wherein said accumulator means comprises an accumulator pipeline formed of a plurality of accumulators including a first accumulator $\alpha_0$ and at least one further accumulator, said device including shifting means, upon entry of a last summand mantissa into said first accumulator, for shifting the contents of said first accumulator to said at least one further accumulator for conversion to floating point form while said first accumulator commences accumulation of summands corresponding to a further sum.

17. A device as defined in claim 16, further comprising means for providing an end of sum signal to said accumulator means following entry of said last summand mantissa into said accumulator means, wherein said accumulator pipeline includes a plurality of further accumulators, the contents of each accumulator being shifted to a subsequent accumulator upon entry of said end of sum signal into said each accumulator while continuing the process of conversion to floating point form, said device further including means for indicating the completion of conversion to floating point form and means, responsive to such indication, for passing the floating point sum to a device output.

18. A device for calculating sums of floating point summands, each summand including a characteristic and a mantissa, and for then calculating an iterative summation of a plurality of successive sums, said device comprising:

a sieve comprising a characteristic decode section for determining the value of the characteristic of each summand and a sieve section responsive to the determined characteristic of a summand for routing that summand toward an appropriate position at the output of said sieve corresponding to a fixed-point representation of said summand, said sieve including coalescence means for combining mantissas of different summands prior to said sieve output;

accumulator means receiving and accumulating outputs from said sieve and converting the accumulated sum to floating point form, to thereby obtain a floating-point representation of each sum, said accumulator means including a plurality of accumulators including a first accumulator $\alpha_0$, a holding accumulator $\beta_0$ and at least one further accumulator;

shifting means, upon entry into said first accumulator of a last summand mantissa in each of said successive sums, for shifting the contents of said first accumulator to said holding accumulator for summation with the contents of said holding accumulator, and upon entry into said holding accumulator of a last sum in said iterative summation, for shifting the contents of said holding accumulator to said at least one further accumulator for conversion to floating point form while said first accumulator and holding accumulator commence calculation of a further iterative summation.

19. A device as defined in claim 18 for concurrently performing a plurality of iterative summations, said accumulator means including a plurality of holding accumulators each for accumulating sums from said first accumulator corresponding to a respective iterative summation.

* * * * *